US012085872B2

(12) United States Patent
Suzuki et al.

(10) Patent No.: US 12,085,872 B2
(45) **Date of Patent: *Sep. 10, 2024**

(54) IMAGE FORMING APPARATUS AND METHOD OF CONTROLLING THE SAME

(71) Applicant: Brother Kogyo Kabushiki Kaisha, Nagoya (JP)

(72) Inventors: Takashi Suzuki, Nagoya (JP); Kazuma Hinoue, Nagoya (JP); Takashi Yasuda, Nagoya (JP); Takashi Shimizu, Nagoya (JP); Yoshifumi Kajikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,980

(22) Filed: Feb. 21, 2023

(65) Prior Publication Data

US 2023/0205110 A1 Jun. 29, 2023

Related U.S. Application Data

(63) Continuation of application No. 17/662,154, filed on May 5, 2022, now Pat. No. 11,599,039, which is a (Continued)

(30) Foreign Application Priority Data

Mar. 31, 2017 (JP) ................................ 2017-070297

(51) Int. Cl.
*G03G 15/08* (2006.01)

(52) U.S. Cl.
CPC ..... *G03G 15/0862* (2013.01); *G03G 15/0855* (2013.01); *G03G 15/0856* (2013.01);
(Continued)

(58) Field of Classification Search
CPC . G03G 15/0856–0862; G03G 15/0865; G03G 15/0877; G03G 15/0879
See application file for complete search history.

(56) References Cited

U.S. PATENT DOCUMENTS 8,571,426 B2 10/2013 Kubota et al.
8,774,648 B2 7/2014 Ogino
(Continued)

FOREIGN PATENT DOCUMENTS

JP 2003-195623 A 7/2003
JP 2012-037567 A 2/2012
(Continued)

OTHER PUBLICATIONS

Feb. 24, 2021—(JP) Notice of Reasons for Refusal—App 2017-070297.

(Continued)

*Primary Examiner* — Carla J Therrien
(74) *Attorney, Agent, or Firm* — Banner & Witcoff, Ltd.

(57) ABSTRACT

An image forming apparatus, including: a photoconductor; a developing device; a developer storage; a supplier configured to supply developer; an optical sensor; and a controller configured to execute: a developing process of developing an electrostatic latent image on the photoconductor; a usage-amount obtaining process of obtaining a usage amount of the developer; a supplying process of supplying the developer to the developing device every time when the obtained usage amount becomes equal to or greater than a first threshold; and a detecting process of detecting, by the optical sensor, an amount of the developer in the developing device every time when the obtained usage amount becomes equal to or greater than a second threshold larger than the first threshold, and wherein the controller is configured to execute the detecting
(Continued)

process in a period different from a period in which the developing process is being executed.

2 Claims, 13 Drawing Sheets

Related U.S. Application Data continuation of application No. 17/026,794, filed on Sep. 21, 2020, now Pat. No. 11,360,406, which is a continuation of application No. 16/504,852, filed on Jul. 8, 2019, now Pat. No. 10,809,647, which is a continuation of application No. 15/940,226, filed on Mar. 29, 2018, now Pat. No. 10,386,745.

(52) U.S. Cl.
CPC . *G03G 15/0865* (2013.01); *G03G 2215/0891* (2013.01); *G03G 2221/183* (2013.01)

(56) References Cited

U.S. PATENT DOCUMENTS

| | | | | |
|---|---|---|---|---|
| 9,069,284 | B2 | 6/2015 | Shimizu et al. | |
| 10,386,745 | B2 | 8/2019 | Suzuki et al. | |
| 10,809,647 | B2 | 10/2020 | Suzuki et al. | |
| 11,360,406 | B2 | 6/2022 | Suzuki et al. | |
| 11,599,039 | B2 * | 3/2023 | Suzuki | G03G 15/0855 |
| 2002/0025195 | A1 * | 2/2002 | Iwata | G03G 15/0877 399/258 |
| 2006/0233560 | A1 | 10/2006 | Harada et al. | |
| 2006/0263106 | A1 | 11/2006 | Yamaguchi et al. | |
| 2008/0212985 | A1 | 9/2008 | Ohashi et al. | |
| 2009/0010659 | A1 | 1/2009 | Watanabe | |
| 2012/0033982 | A1 | 2/2012 | Kubota et al. | |
| 2012/0106990 | A1 * | 5/2012 | Kayahara | G03G 15/086 399/27 |
| 2012/0230730 | A1 | 9/2012 | Ogino | |
| 2013/0058670 | A1 | 3/2013 | Nakatake et al. | |
| 2014/0029962 | A1 | 1/2014 | Shimizu et al. | |
| 2014/0226995 | A1 | 8/2014 | Oida | |
| 2015/0063839 | A1 | 3/2015 | Takahashi | |
| 2015/0078766 | A1 | 3/2015 | Kang et al. | |
| 2015/0355573 | A1 | 12/2015 | Jeong et al. | |
| 2016/0124366 | A1 | 5/2016 | Shimazu | |
| 2018/0284640 | A1 | 10/2018 | Suzuki et al. | |
| 2018/0284673 | A1 | 10/2018 | Suzuki et al. | |
| 2019/0155189 | A1 | 5/2019 | Hinoue et al. | |
| 2020/0150559 | A1 * | 5/2020 | Makinodan | G03G 15/0856 |

FOREIGN PATENT DOCUMENTS

| | | | |
|---|---|---|---|
| JP | 2012-189712 | A | 10/2012 |
| JP | 2013-152402 | A | 8/2013 |
| JP | 2014-26045 | A | 2/2014 |
| JP | 2015-004872 | A | 1/2015 |

OTHER PUBLICATIONS

Sep. 24, 2021—(CN) First Office Action—App 201810257058.2.
Mar. 16, 2022—(CN) Notification of the Second Office Action—App 201810257058.2.

* cited by examiner

IMAGE FORMING APPARATUS AND METHOD OF CONTROLLING THE SAME

CROSS REFERENCE TO RELATED APPLICATION

The present application is a continuation of U.S. patent application Ser. No. 17/662,154 filed May 5, 2022, which is a continuation of U.S. patent application Ser. No. 17/026,794 filed Sep. 21, 2020, issued as U.S. Pat. No. 11,360,406 on Jun. 14, 2022, which is a continuation of U.S. patent application Ser. No. 16/504,852 filed Jul. 8, 2019, issued as U.S. Pat. No. 10,809,647 on Oct. 20, 2020, which is a continuation of U.S. patent application Ser. No. 15/940,226 filed Mar. 29, 2018, issued as U.S. Pat. No. 10,386,745 on Aug. 20, 2019 which claims priority from Japanese Patent Application No. 2017-070297, which was filed on Mar. 31, 2017, the disclosures of which is herein incorporated by reference in their entirety.

BACKGROUND

Technical Field

The following disclosure relates to an image forming apparatus including a supplier configured to supply a developer from a developer storage to a developing device and also relates to a method of controlling the image forming apparatus.

Description of Related Art

There has been known an image forming apparatus including: a developing device having a developing roller; a supplier configured to add or supply new or fresh toner into the developing device as needed; and an optical sensor configured to detect an amount of the toner in the developing device. In the known apparatus, the toner is supplied in accordance with an amount of consumption of the toner so as to keep the amount of the toner in the developing device constant.

The amount of consumption of the toner is calculated based on a dot count, and the supply amount of the toner is set to an amount estimated so as to be smaller than the calculated amount of consumption of the toner. In this configuration, the amount of the toner in the developing device tends to gradually decrease in accordance with consumption of the toner. Thus, in the case where the amount of the toner in the developing device detected by the optical sensor is greater than a predetermined value, the toner is supplied in an amount in accordance with the consumption amount. In the case where the detected amount of the toner in the developing device is less than the predetermined value, a predetermined amount of the toner is supplied into a developing chamber.

SUMMARY

In the case where a printing speed is increased, it is needed to rotate, in a printing control, a member of the developing device, such as a developing roller, at a high speed. In this case, if the detection of the toner amount is performed by the optical sensor in the printing control, there may arise a risk of not accurately detecting the toner amount.

Accordingly, one aspect of the present disclosure relates to a technique of detecting, in an image forming apparatus including a supplier configured to supply toner (developer) into a developing device, an amount of the toner in the developing device with high accuracy.

One aspect of the present disclosure provides an image forming apparatus, including: a photoconductor; a developing device including a developing roller configured to form a developer image on the photoconductor; a developer storage storing developer; a supplier configured to supply the developer from the developer storage to the developing device; an optical sensor including a light emitting portion configured to emit light into the developing device and a light receiving portion configured to receive the light emitted from the light emitting portion and passed through the developing device; and a controller configured to execute: a developing process of developing, by the developing device, an electrostatic latent image on the photoconductor; a usage-amount obtaining process of obtaining, by the image forming apparatus, a usage amount of the developer; a supplying process of supplying, by the supplier, the developer to the developing device every time when the obtained usage amount of the developer becomes equal to or greater than a first threshold; and a detecting process of detecting, by the optical sensor, an amount of the developer contained in the developing device every time when the obtained usage amount of the developer becomes equal to or greater than a second threshold larger than the first threshold, and wherein the controller is configured to execute the detecting process in a period different from a period in which the developing process is being executed.

Another aspect of the present disclosure provides an image forming apparatus, including: a photoconductor; a developing device including a developing roller configured to form a developer image on the photoconductor; a developer storage storing developer; a supplier configured to supply the developer from the developer storage to the developing device; an optical sensor including a light emitting portion configured to emit light into the developing device and a light receiving portion configured to receive the light emitted from the light emitting portion and passed through the developing device; and a controller configured to execute: a developing process of developing, by the developing device, an electrostatic latent image on the photoconductor; a usage-amount obtaining process of obtaining, by the image forming apparatus, a usage amount of the developer; a supplying process of supplying, by the supplier, the developer to the developing device; and a detecting process of detecting, by the optical sensor, an amount of the developer contained in the developing device every time when the obtained usage amount of the developer becomes equal to or greater than a threshold, and wherein the developing device includes an agitator configured to agitate the developer in the developing device, and wherein the controller is configured to: set a speed of the agitator in the developing process to a first speed; and set a speed of the agitator in the detecting process to a second speed lower than the first speed.

Still another aspect of the present disclosure provides a method of controlling an image forming apparatus including: a photoconductor; a developing device including a developing roller configured to form a developer image on the photoconductor; a developer storage storing developer; a supplier configured to supply the developer from the developer storage to the developing device; and a sensor configured to detect an amount of the developer contained in the developing device, the method including: a developing step of developing, by the developing device, an electrostatic latent image on the photoconductor; an obtaining step of obtaining, by the image forming apparatus, a usage amount of the developer; a supplying step of supplying, by the supplier, the developer to the developing device every time when the obtained usage amount of the developer becomes equal to or greater than a first threshold; and a detecting step of detecting, by the sensor, an amount of the developer contained in the developing device in a period different from a period in which the step of developing the electrostatic latent image is being executed every time when the obtained usage amount of the developer becomes equal to or greater than a second threshold larger than the first threshold.

BRIEF DESCRIPTION OF THE DRAWINGS

The objects, features, advantages, and technical and industrial significance of the present disclosure will be better understood by reading the following detailed description of one embodiment, when considered in connection with the accompanying drawings, in which.

DETAILED DESCRIPTION OF THE EMBODIMENT

Figure 1:
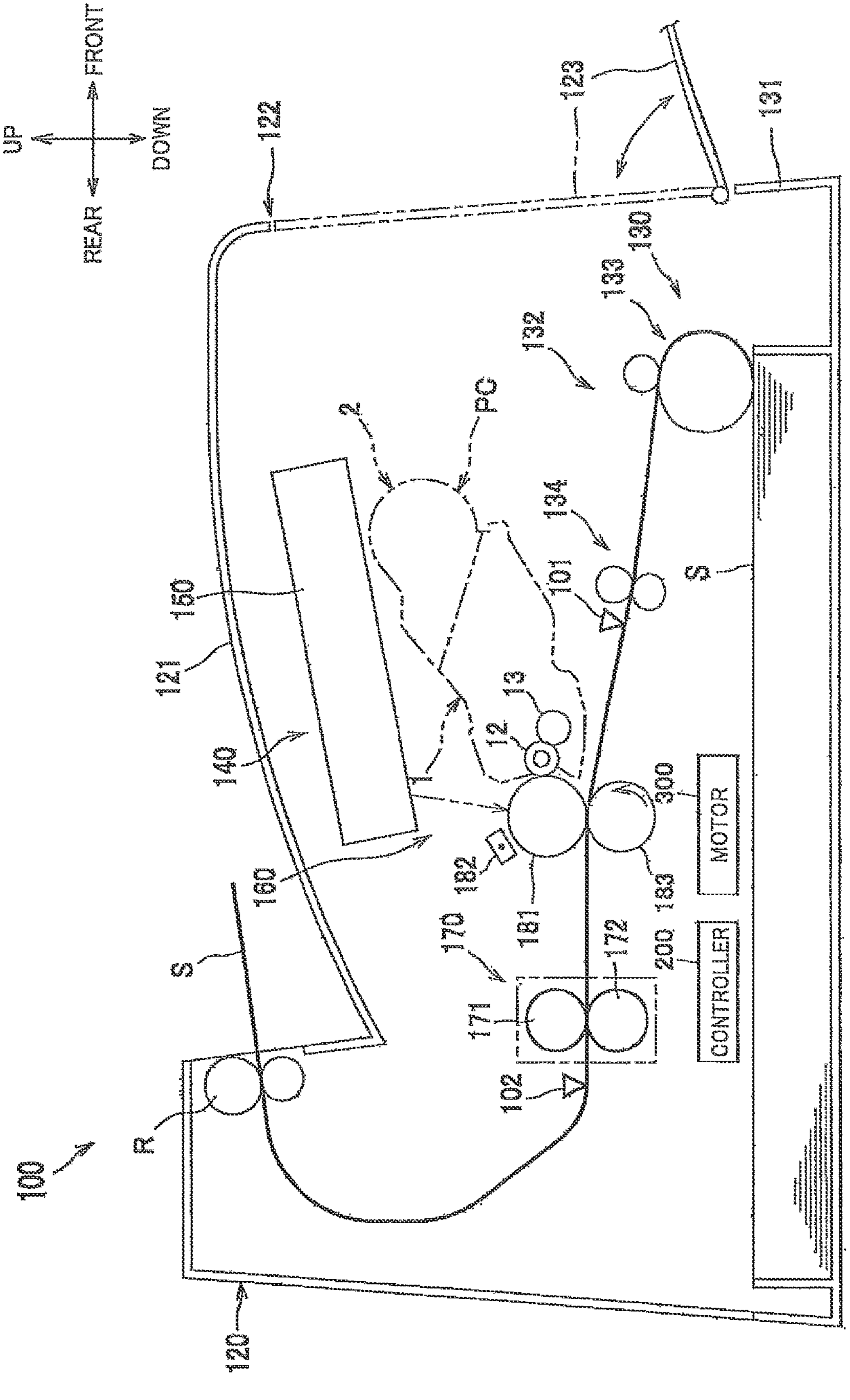
FIG. 1 is a view showing a general structure of a printer according to one embodiment.

There will be next explained in detail one embodiment of the present disclosure referring to the drawings. In the following explanation, directions are defined based on directions indicated in FIG. 1. That is, a right side and a left side in FIG. 1 are respectively defined as a front side and a rear side, and a side corresponding to a back surface of the sheet of FIG. 1 and a side corresponding to a front surface of the sheet of FIG. 1 are respectively defined as a right side and a left side. Further, an up-down direction in FIG. 1 is defined as an up-down direction.

As shown in FIG. 1, a printer 100 as one example of an image forming apparatus includes in a printer housing 120, a feeder portion 130 configured to supply a sheet S as one example of a sheet, an image forming portion 140 configured to form an image on the sheet S, a controller 200, and a motor 300 as one example of a drive source. A drive force of the motor 300 is transmitted to the feeder portion 130 and the image forming portion 140.

The feeder portion 130 includes a sheet supply tray 131 removably mounted on a lower portion of the printer housing 120 and a conveyor mechanism 132 configured to convey the sheet S in the sheet supply tray 131 toward a transfer roller 183. The conveyor mechanism 132 includes: a sheet supply mechanism 133 configured to convey the sheet S in the sheet supply tray 131 toward registration rollers 134; and the registration rollers 134 for properly positioning each position in the leading edge of the sheet S being conveyed. A first sheet sensor 101, as one example of a detector, is provided downstream of the registration rollers 134 in a conveyance direction of the sheet S. The first sheet sensor 101 is configured to detect the sheet S conveyed from the registration rollers 134 toward the transfer roller 183. The first sheet sensor 101 is disposed nearer to the registration rollers 134 than to the transfer roller 183.

The first sheet sensor 101 includes, for instance, a swing lever configured to swing by being pushed by the sheet S that is being conveyed and an optical sensor configured to detect swinging of the swing lever. In the present embodiment, the first sheet sensor 101 is in an ON state while the sheet S is passing, namely, while the swing lever is being laid down by the sheet S.

The image forming portion 140 includes an exposing device 150, a process unit 160, and a fixing device 170.

The exposing device 150 of a laser scanner unit is provided in an upper portion of the printer housing 120 and includes a laser light emitter, a polygon mirror, lenses, and reflective mirrors. In the exposing device 150, a laser beam is applied to a surface of a photoconductive drum 181 by high-speed scanning.

The process unit 160 includes the photoconductive drum 181 as one example of a photoconductor, a charger 182, the transfer roller 183 as one example of a transfer device, and a process cartridge PC. Toner, as one example of a developer, is stored in the process cartridge PC.

The process cartridge PC is mountable on and removable from the printer housing 120 through an opening 122 which is opened and closed by a front cover 123 pivotably provided on a front wall of the printer housing 120. The process cartridge PC will be later explained in detail.

In the process unit 160, the surface of the photoconductive drum 181 that rotates is uniformly charged by the charger 182 and is subsequently exposed to a high-speed scanning of a laser beam from the exposing device 150. Thus, an electrostatic latent image based on image data is formed on the surface of the photoconductive drum 181.

Subsequently, the toner in the process cartridge PC is supplied to the electrostatic latent image on the photoconductive drum 181, so that a toner image is formed on the surface of the photoconductive drum 181. Thereafter, the sheet S is conveyed between the photoconductive drum 181 and the transfer roller 183, so that the toner image formed on the surface of the photoconductive drum 181 is transferred onto the sheet S.

The fixing device 170 includes a heating roller 171 and a pressure roller 172 pressed onto the heating roller 171. The fixing device 170 thermally fixes the toner transferred onto the sheet S while the sheet S is passing between the heating roller 171 and the pressure roller 172. A second sheet sensor 102 is disposed downstream of the fixing device 170 in the conveyance direction of the sheet S. The second sheet sensor 102 is configured to detect passage of the sheet S discharged from the fixing device 170. The second sheet sensor 102 is similar in construction to the first sheet sensor 101 described above.

The sheet S that has been subjected to thermal fixation of the toner by the fixing device 170 is conveyed to a discharge roller R disposed downstream of the fixing device 170 and is subsequently discharged onto the sheet discharge tray 121 by the discharge roller R.

Figure 2:
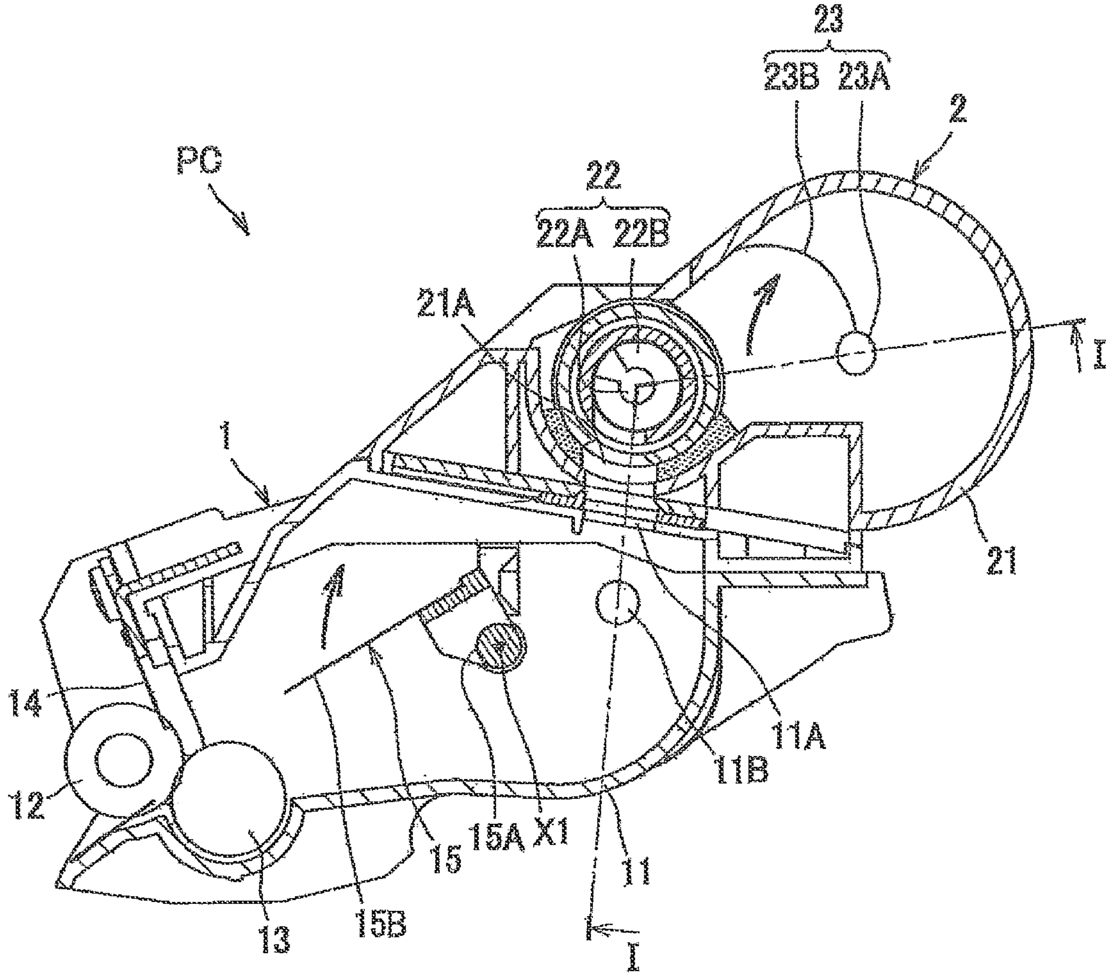
FIG. 2 is a cross-sectional view of a process cartridge.

As shown in FIG. 2, the process cartridge PC includes a developing cartridge 1 as one example of a developing device and a toner cartridge 2 as one example of a developer storage.

The developing cartridge 1 includes a housing 11, a developing roller 12, a supply roller 13, a layer-thickness limiting blade 14, and a first agitator 15 as one example of an agitator. The housing 11 houses the developer therein. The housing 11 supports the layer-thickness limiting blade 14 and rotatably supports the developing roller 12, the supply roller 13, and the first agitator 15.

The developing roller 12 is configured to supply the toner to the electrostatic latent image formed on the photoconductive drum 181. The developing roller 12 is rotatable about a rotation axis extending in a right-left direction.

The supply roller 13 is configured to supply, to the developing roller 12, the toner in the housing 11. The layer-thickness limiting blade 14 is a member for limiting a thickness of the toner on the developing roller 12.

The first agitator 15 includes: a shaft portion 15A rotatable about a first axis X1 which is a rotation axis parallel to a rotation axis of the developing roller 12; and an agitating blade 15B fixed to the shaft portion 15A. The housing 11 rotatably supports the shaft portion 15A. The agitating blade 15B is configured to rotate clockwise in FIG. 2 together with the shaft portion 15A, so as to agitate the toner in the housing 11.

Figure 3:
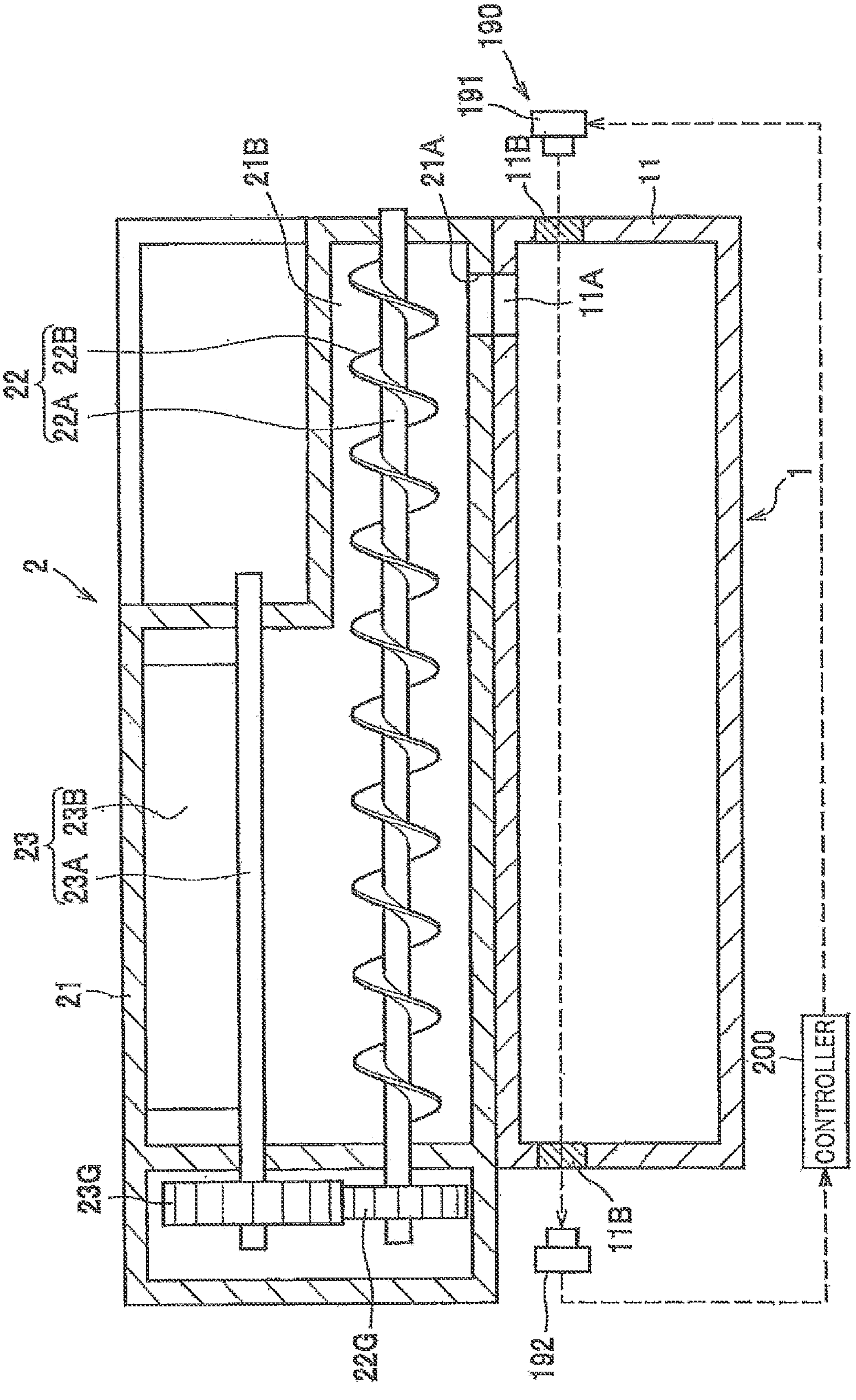
FIG. 3 is a cross-sectional view taken along line I-I in FIG. 2.

As shown in FIG. 3, the printer 100 includes an optical sensor 190 configured to detect an amount of the toner in the housing 11. The optical sensor 190 includes a light emitter 191 for emitting light into an inside of the housing 11 and a light receiver 192 for receiving the light emitted from the light emitter 191 and passed through the inside the housing 11. The light emitter 191 and the light receiver 192 are provided on the printer housing 120. Specifically, the light emitter 191 is disposed on one of opposite sides of the housing 11 in the right-left direction, and the light receiver 192 is disposed on the other of the opposite sides of the housing 11 in the right-left direction.

The housing 11 includes light guide portions 11B which permit the light emitted from the light emitter 191 to pass through the inside of the housing 11, so as to guide the light to the light receiver 192. The light guide portions 11B are formed on respective wall surfaces of the housing 11 in the right-left direction. Each light guide portion 11B is formed of a light transmitting member that enables transmission of the light from the light emitter 191. The wall surfaces of the housing 11 in the right-left direction are formed of a material that does not allow transmission of the light from the light emitter 191. As shown in FIG. 2, the light guide portions 11B are located at a height level higher than the first axis X1. Thus, the light emitted from the light emitter 191 passes between the first axis X1 and an auger 22 (which will be explained) in the up-down direction.

The toner cartridge 2 is mountable on and removable from the developing cartridge 1. The toner cartridge 2 includes: a housing 21 in which the toner is stored; the auger 22, as one example of a supplier, configured to supply the toner in the housing 21 to the developing cartridge 1; and a second agitator 23 configured to rotate clockwise in FIG. 2 so as to agitate the toner in the housing 21.

The auger 22 is rotatable about a rotation shaft 22A extending in the right-left direction. The auger 22 is configured to rotate so as to convey the toner in the housing 21 in the axial direction. Specifically, the auger 22 is a screw auger including the rotation shaft 22A and a plate 22B helically provided around the rotation shaft 22A. The plate 22B of the auger 22 is formed integrally with the rotation shaft 22A.

The housing 21 includes an outlet 21A through which the toner in the housing 21 is supplied to the developing cartridge 1 and a toner conveyor portion 21B surrounding the auger 22. The toner conveyor portion 21B is a portion whose diameter is reduced so as to be located near to an outside of the auger 22. The housing 11 of the developing cartridge 1 includes an inlet 11A facing the outlet 21A. The outlet 21A and the inlet 11A are located below the auger 22 and on one end side of the auger 22 in the axial direction. In this configuration, as shown in FIG. 3, when the auger 22 rotates, the toner is conveyed toward the one end side in the axial direction by the helical plate 22B, so that the toner is supplied into the housing 11 through the outlet 21A and the inlet 11A.

The auger 22 includes an auger gear 22G as one example of a transmission gear. The auger gear 22G is a gear for transmitting a drive force to the auger 22. The auger gear 22G is fixed to the shaft of the auger 22.

The second agitator 23 includes a shaft portion 23A parallel to the right-left direction and an agitating blade 23B provided on the shaft portion 23A. A second agitator gear 23G is fixed to one end portion of the shaft portion 23A of the second agitator 23. The second agitator gear 23G is in mesh with the auger gear 22G.

Figure 4A:
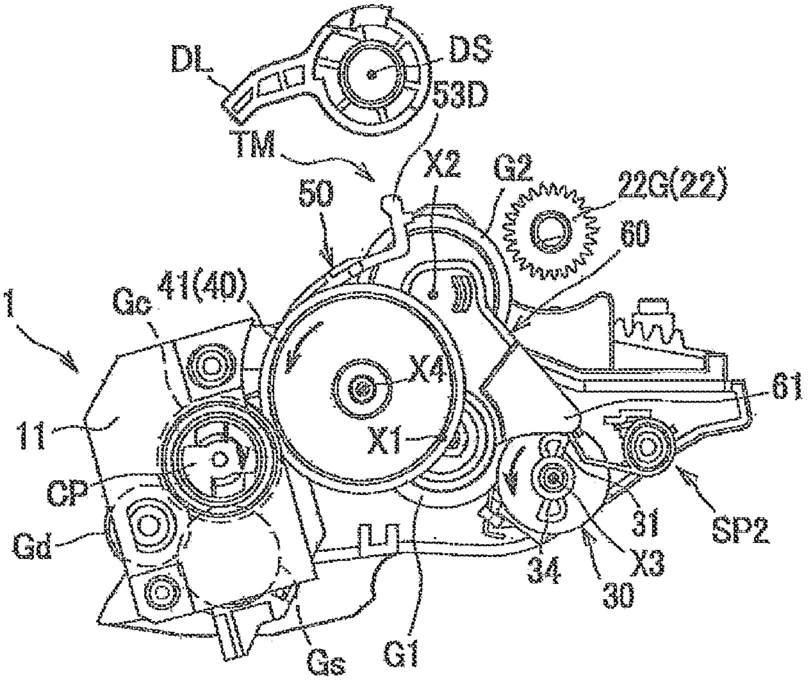
FIG. 4A is a view showing a relationship among members when a transmitting mechanism is in a disconnected state.

As shown in FIG. 4A, the developing cartridge 1 includes a coupling CP, a developing gear Gd, a supply gear Gs, a fourth gear 40, and a transmitting mechanism TM. The coupling CP is configured to rotate clockwise in FIG. 4A when the drive force is input thereto from the motor 300 (FIG. 1). The coupling CP includes a coupling gear Gc.

The developing gear Gd is a gear for driving the developing roller 12. The developing gear Gd is in mesh with the coupling gear Gc. The supply gear Gs is a gear for driving the supply roller 13. The supply gear Gs is in mesh with the coupling gear Gc.

The fourth gear 40 is rotatable about a fourth axis X4 extending in the axial direction. The fourth gear 40 includes a large-diameter gear 41 which is in mesh with the coupling gear Gc and a small-diameter gear 42 (FIG. 4C) having a smaller outside diameter than the large-diameter gear 41. The small-diameter gear 42 rotates together with the large-diameter gear 41. The small-diameter gear 42 is located between the housing 11 and the large-diameter gear 41 in the axial direction. The fourth gear 40 rotates counterclockwise in FIG. 4A when the drive force of the motor 300 is input to the coupling CP.

The transmitting mechanism TM is a mechanism for transmitting the drive force of the motor 300 to the auger 22. A state of the transmitting mechanism TM is switchable between: a disconnected state in which the drive force is not transmitted to the auger 22; and a connected state in which the drive force is transmitted to the auger 22. The transmitting mechanism TM includes mainly a first gear G1, a second gear G2, a lever 50, a supporter 60, and a third gear 30.

Figure 4B:
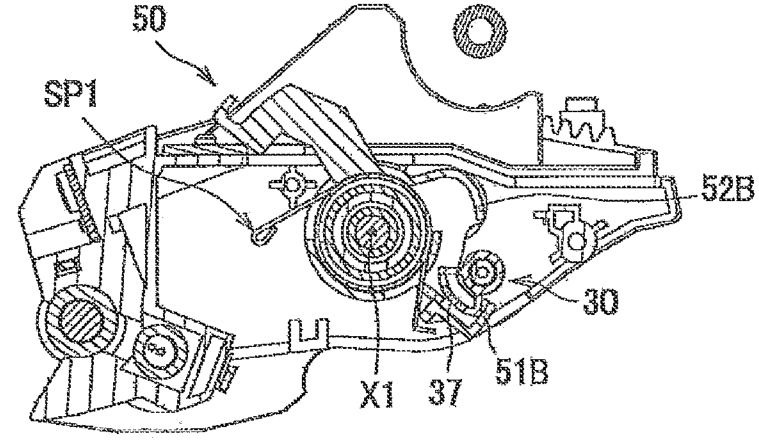
FIG. 4B is a view showing a relationship among the members when the transmitting mechanism is in the disconnected state.
Figure 4C:
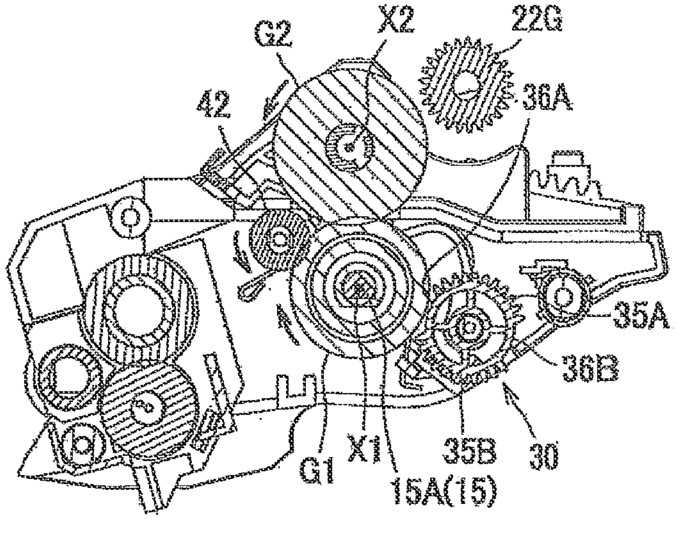
FIG. 4C is a view showing a relationship among the members when the transmitting mechanism is in the disconnected state.

The first gear G1 is fixed to the shaft portion 15A of the first agitator 15. Thus, the first gear G1 rotates about the first axis X1 together with the first agitator 15. As shown in FIG. 4C, the first gear G1 is in mesh with the small-diameter gear 42 of the fourth gear 40. Thus, the drive force of the motor 300 is input to the first gear G1. The first gear G1 to which the drive force is input rotates clockwise in FIG. 4C.

The second gear G2 is rotatable about a second axis X2 extending in the axial direction. The second gear G2 is pivotable about the first gear G1 while being in mesh with the first gear G1. Specifically, the second gear G2 is revolvable about the first axis X1 and pivots between: a first position shown in FIG. 4C; and a second position shown in FIG. 5C. When the second gear G2 is positioned at the first position, the second gear G2 is out of mesh with the auger gear 22G. When the second gear G2 is positioned at the second position, the second gear G2 is in mesh with the auger gear 22G.

The supporter 60 rotatably supports the first gear G1 and the second gear G2. The supporter 60 is pivotable about the first axis X1 with the second gear G2 between a first position and a second position.

Figure 5A:
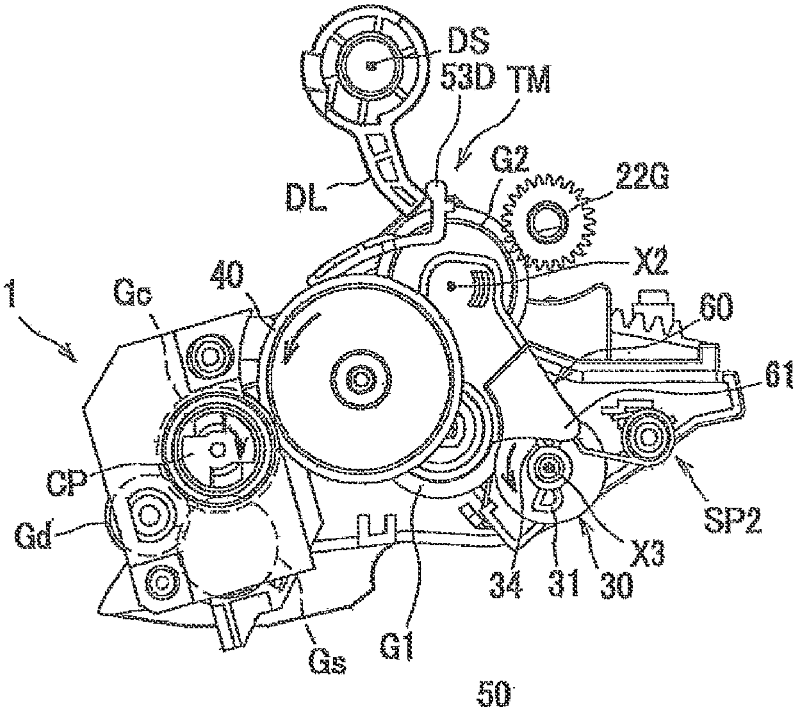
FIG. 5A is a view showing a relationship among the members when the transmitting mechanism is in a connected state.

As shown in FIG. 4A, the third gear 30 is rotatable about a third axis X3 extending in the axial direction. The third gear 30 includes: a cam 31 for pressing, counterclockwise in FIG. 4A, a pressed portion 61 which is a lower end portion of the supporter 60; and a spring engaging portion 34. The spring engaging portion 34 has a dimension (height) in the axial direction smaller than that of the cam 31, so that the spring engaging portion 34 does not come into contact with the pressed portion 61 of the supporter 60. The spring engaging portion 34 is disposed opposite to the cam 31 with the third axis X3 interposed therebetween. The cam 31 and the spring engaging portion 34 have an identical shape as viewed in the axial direction and are configured to be biased by a second spring SP2. The second gear G2 is placed at the first position when the pressed portion 61 of the supporter 60 is supported by the cam 31 as shown in FIG. 4A, and the second gear G2 is movable to the second position when the cam 31 is moved away from the supporter 60 as shown in FIG. 5A.

Figure 5B:
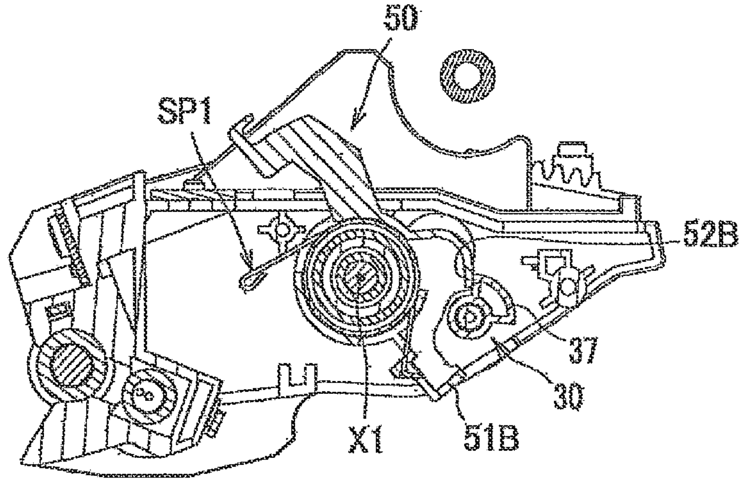
FIG. 5B is a view showing a relationship among the members when the transmitting mechanism is in the connected state.

When the second gear G2 is positioned at the first position, the cam 31 is biased counterclockwise in FIG. 4A by the second spring SP2. When the second gear G2 is positioned at the second position, the spring engaging portion 34 is biased counterclockwise in FIG. 5A by the second spring SP2. The biasing force of the second spring SP2 when the second gear G2 is positioned at the first position is received by a first engaging portion 51B of the lever 50 via a protruding portion 37 provided for the third gear 30, as shown in FIG. 4B. The biasing force of the second spring SP2 when the second gear G2 is positioned at the second position is received by a second engaging portion 52B of the lever 50 via the protruding portion 37, as shown in FIG. 5B.

Figure 5C:
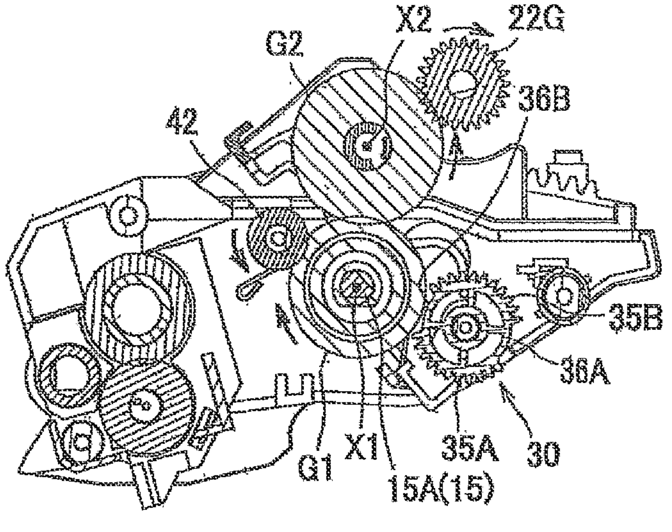
FIG. 5C is a view showing a relationship among the members when the transmitting mechanism is in the connected state.

As shown in FIG. 4C, the third gear 30 includes two gear toothed portions 35A, 35B and two missing tooth portions 36A, 36B. When the second gear G2 is positioned at the first position, one of the two missing tooth portions, namely, the missing tooth portion 36A, is opposed to the first gear G1. When the second gear G2 is positioned at the second position, the other of the two missing tooth portions, namely, the missing tooth portion 36B, is opposed to the first gear G1 (FIG. 5C).

As shown in FIG. 4B, the lever 50 is pivotable about the first axis X1 and is biased counterclockwise by a first spring SP1. The engaging portions 51B, 52B described above are provided at one end of the lever 50. At the other end of the lever 50, there is provided a receiving portion 53D which is engageable with a driving lever DL provided on the printer housing 120. The driving lever DL pivots about a pivot shaft DS provided on the printer housing 120.

In the thus constructed transmitting mechanism TM, when the driving lever DL pivots counterclockwise from the state shown in FIG. 4A, the lever 50 is pivoted clockwise by the driving lever DL against the biasing force of the first spring SP1. As a result, the first engaging portion 51B of the lever 50 shown in FIG. 4B is disengaged from the protruding portion 37.

When the first engaging portion 51B is disengaged from the protruding portion 37, the third gear 30 is rotated counterclockwise by the biasing force of the second spring SP2. As a result, the first gear toothed portion 35A of the third gear 30 shown in FIG. 4C is brought into mesh with the first gear G1.

When the first gear toothed portion 35A is brought into mesh with the first gear G1, the third gear 30 to which the drive force is transmitted from the first gear G1 is further rotated. As a result, the cam 31 shown in FIG. 4A pivots in a direction away from the pressed portion 61 which is the lower end portion of the supporter 60.

When the cam 31 thus pivots, the supporter 60 that has been supported by the cam 31 pivots from the first position to the second position. Specifically, the supporter 60 receives a friction force from the first gear G1 that rotates clockwise, so that the supporter 60 pivots in the same direction as the rotational direction of the first gear G1.

When the supporter 60 thus pivots, the second gear G2 supported by the supporter 60 also pivots from the first position to the second position. Further, the second gear G2 receives the drive force from the first gear G1, so that the second gear G2 rotates counterclockwise. As a result, the second gear G2 is brought into mesh with the auger gear 22G, so that the auger 22 is rotated. That is, the state of the transmitting mechanism TM is switched from the disconnected state to the connected state, whereby the developing roller 12, the supply roller 13, the first agitator 15, the auger 22, and the second agitator 23 are rotated by the drive force of the motor 300.

When the third gear 30 further rotates, the spring engaging portion 34 pivots toward the second spring SP2 so as to once contract the second spring SP2. Thereafter, the spring engaging portion 34 pivots in a direction away from the second spring SP2, so that the spring engaging portion 34 is biased counterclockwise by the second spring SP2. As shown in FIG. 5C, when the first gear toothed portion 35A of the third gear 30 becomes out of mesh with the first gear G1, the transmission of the drive force from the first gear G1 to the third gear 30 is cut off. In this instance, the second spring SP2 biases the spring engaging portion 34 as described above, so that the third gear 30 slightly rotates by the biasing force of the second spring SP2 and the protruding portion 37 shown in FIG. 5B comes into engagement with the second engaging portion 52B of the lever 50. As a result, as shown in FIG. 5A, the third gear 30 stops rotating, so that the cam 31 is kept at a position away from the pressed portion 61 of the supporter 60. Thus, the second gear G2 is kept positioned at the second position.

When the driving lever DL is returned from the state of FIG. 5A to its original position (shown in FIG. 4A), the lever 50 is returned to its original position by the biasing force of the first spring SP1. Thus, the second engaging portion 52B is disengaged from the protruding portion 37, and the cam 31 pivots to and stops at the position shown in FIG. 4A according to a motion similar to that described above. The pressed portion 61 of the supporter 60 is pushed by the cam 31 which thus pivots. As a result, the pressed portion of the supporter pivots counterclockwise, so that the second gear G2 moves from the second position to the first position. That is, the state of the transmitting mechanism TM is switched from the connected state to the disconnected state, whereby the auger 22 and the second agitator 23 stop rotating whereas the developing roller 12, the supply roller 13, and the first agitator 15 keep rotating.

The controller 200 includes a CPU, a RAM, a ROM, a nonvolatile memory, an ASIC, and an input/output circuit. The controller 200 executes control by executing various arithmetic processing based on a print command output from an external computer, signals output from the sensors 101, 102, 190 (FIG. 3), and programs and data stored in the ROM, for instance. The controller 200 is configured to execute a developing process, a usage-amount obtaining process, a supplying process, a detecting process, and a supply-amount calculating process. In other words, the controller 200 operates based on the programs so as to function as a means to execute the processes described above. Further, a controlling method by the controller 200 includes steps of executing the processes.

The developing process is a process of developing an electrostatic latent image on the photoconductive drum 181. Specifically, in a state in which an appropriate voltage is applied to the developing roller 12, the controller 200 executes an exposure process in which the controller blinks the exposing device 150 based on image data in accordance with the print command, so as to execute the developing process. Further, the controller 200 causes the first agitator 15 to rotate at a first speed V1 in the developing process.

The usage-amount obtaining process is a process of obtaining a usage amount Qu of the toner in the developing process. In the usage-amount obtaining process, the controller 200 obtains the usage amount Qu based on the number of dots of binary image data used in the exposure.

In the case where the number of dots per unit area is not greater than a predetermined value, the number of dots may be regarded as the predetermined value. In a toner saving mode, for instance, the usage amount Qu may be calculated so as to be smaller by multiplying the number of dots by a coefficient less than 1.

The controller 200 has a function of executing the usage-amount obtaining process after a toner image corresponding to an image for one sheet S has been formed on the photoconductive drum 181 in the developing process. Specifically, in the present embodiment, the controller 200 executes the usage-amount obtaining process after the state of the second sheet sensor 102 has been switched from ON to OFF, namely, after the sheet S has passed through the fixing device 170.

The supplying process is a process of supplying the toner by the auger 22 to the developing cartridge 1. The controller 200 executes the supplying process on the condition that the usage amount Qu from a time point of execution of a preceding supplying process up to a current time point becomes equal to or greater than a first threshold TH1. Specifically, in the present embodiment, the controller 200 sets a flag F1 for executing the supplying process to 1 in the case where an increase amount Qu1, as one example of a first usage amount, of the usage amount Qu from the time point of execution of the preceding supplying process up to the current time point becomes equal to or greater than the first threshold TH1. In this configuration, the supplying process is executed every time when the usage amount Qu of the toner becomes equal to or greater than the first threshold TH1.

Here, the first threshold TH1 is set to satisfy the following expression (1):

$$M \leq TH1 \leq 2M \quad (1)$$

M: maximum usage amount of toner for sheet S having a maximum size that can be printed The controller 200 has a function of supplying a predetermined amount of the toner to the developing cartridge 1 in the supplying process. In the supplying process, the controller 200 causes the auger 22 to rotate by the predetermined number of times. Specifically, the controller 200 causes, in the supplying process, the auger 22 to rotate at a predetermined rotational speed for a predetermined length of time. Here, the predetermined length of time corresponds to an execution period Td of the supplying process. In other words, in the supplying process, the toner is supplied to the developing cartridge 1 in an amount determined based on the predetermined length of time of the supply of the toner by the auger 22.

Here, an amount MF of the toner supplied to the developing cartridge 1 in the supplying process is set so as to satisfy the following expression (2):

$$TH1 \leq MF \leq 2M \quad (2)$$

TH1: first threshold

M: maximum usage amount of toner for sheet S having a maximum size that can be printed In the present embodiment, the increase amount Qu1 of the usage amount Qu is updated to a value obtained by subtracting the first threshold TH1 every time when the supplying process is executed, specifically, every time when the flag F1 is set to 1. Further, the usage amount Qu is counted as a total usage amount Qus and reset to an initial value every time when the toner cartridge 2 is replaced with new one.

The controller 200 has a function of starting, based on the signal indicative of detection of the sheet S by the first sheet sensor 101, the supplying process before the formation of the electrostatic latent image for the sheet S is started. Specifically, the controller 200 starts the supplying process when a first predetermined length of time T1 elapses from a time point when the state of the first sheet sensor 101 has been switched from OFF to ON.

Here, where a length of time before a time point of starting of the exposure process for the sheet S detected by the first sheet sensor 101 from the time point when the ON state of the first sheet sensor 101 has been established is defined as a third predetermined length of time T3, the first predetermined length of time T1 is set so as to satisfy the following expression (3):

$$T1 < T3 \quad (3)$$

When the controller 200 starts the supplying process, the controller 200 controls the transmitting mechanism TM such that the state of the transmitting mechanism TM is switched from the disconnected state to the connected state by pivoting the driving lever DL counterclockwise in FIG. 4. After the formation of the electrostatic latent image corresponding to an image for one sheet S has been completed, namely, after the exposure process for one sheet S has been completed, the controller 200 ends the supplying process. Specifically, when the execution period Td elapses from the time point of starting of the supplying process, the controller 200 ends the supplying process and sets the flag F1 to 0. When the controller 200 ends the supplying process, the controller 200 controls the transmitting mechanism TM such that the state of the transmitting mechanism TM is switched from the connected state to the disconnected state by pivoting the driving lever DL clockwise in FIG. 5.

The execution period Td is set so as to satisfy the following expression (4):

$$L1/Va<Td<(L1+2L2)/Va \quad (4)$$

L1: length of one sheet S in the conveyance direction

L2: distance between successively conveyed two sheets S in successive printing (successive printing operation)

Va: conveyance speed of sheet S

That is, the execution period Td is longer than a conveyance time of one sheet S (conveyance time when one sheet S is conveyed by a distance corresponding to the length of the one sheet S) and is shorter than a sum of: the conveyance time of the one sheet S; and a time when the one sheet S is conveyed by distances between the one sheet S and sheets (preceding and next sheets).

In relation to an execution period Te for executing the exposure process for one sheet, the execution period Td is set so as to satisfy the following expression (5):

$$Td>T3+Te-T1 \quad (5)$$

T3: third predetermined length of time

T1: first predetermined length of time

By thus setting the execution period Td, the supplying process can be ended after completion of the exposure process.

In the case where successive printing (successive printing operation) is executed, the controller 200 controls the conveyor mechanism 132 such that a distance between two sheets S successively conveyed is equal to a first distance. In the case where the supplying process is started during the execution of successive printing, the controller 200 controls the conveyor mechanism 132 such that the distance between the successive two sheets S is equal to a second distance larger than the first distance. Specifically, in the case where successive printing is executed in the present embodiment, the controller 200 changes timing at which the sheet S in the sheet supply tray 131 is picked up by the sheet supply mechanism 133 depending upon whether the supplying process is permitted to be executed. Here, the timing of pickup (hereinafter referred to as "conveying timing" where appropriate) refers to a time interval from a time point when a certain sheet S has been picked up and a time point when a next sheet S is picked up. In the case where the supplying process is not executed in successive printing, the controller 200 sets the conveying timing to first conveying timing. In the case where the supplying process is executed in successive printing, the controller 200 sets the conveying timing to second conveying timing larger than the first conveying timing.

The detecting process is a process of detecting, by the optical sensor 190, the amount of the toner in the developing cartridge 1, on the condition that the usage amount Qu from a time point of execution of a preceding detecting process up to a current time point becomes equal to or greater than a second threshold TH2 larger than the first threshold TH1. Specifically, in the present embodiment, the controller 200 executes the detecting process when an increase amount Qu2, as one example of a second usage amount, of the usage amount Qu from the time point of execution of the preceding detecting process up to the current time point becomes equal to or greater than the second threshold TH2. In this configuration, the detecting process is executed every time when the usage amount Qu of the developer becomes equal to or greater than the second threshold TH2. The controller 200 executes the detecting process in a period in which the developing process is not being executed. In other words, the controller 200 executes the detecting process in a period different from a period in which the developing process is being executed.

Here, the second threshold TH2 may be set to a value more than twice as large as the first threshold TH1, e.g., a value ten times as large as the first threshold TH1, for instance. The increase amount Qu2 of the usage amount Qu is updated to a value obtained by subtracting the second threshold TH2 every time when the detecting process is executed. The increase amount Qu1 and the increase amount Qu2 are updated independently of each other.

In the case where the usage amount Qu becomes equal to or greater than the second threshold TH2 during execution of the print job, the controller 200 suspends the print job and executes the detecting process. In the detecting process, the controller 200 controls the motor 300 such that the first agitator 15 rotates at a second speed V2 lower than the first speed V1. Thus, the rotational speed of the first agitator 15 is lower in the detecting process than in the developing process.

In the case where the amount of the toner detected in the detecting process, namely, an amount Qr of the toner contained in the developing cartridge 1 (toner amount Qr), is larger than a predetermined amount Qth, the controller 200 executes control not to execute the supplying process. In the case where the toner amount Qr in the developing cartridge 1 detected in the detecting process is larger than the predetermined amount Qth, the controller 200 sets a flag F2 to 1. On the other hand, in the case where the toner amount Qr is equal to or smaller than the predetermined amount Qth, the controller 200 sets the flag F2 to 0. When the flag F2 is 1, the supplying process is not executed. The supplying process is executed when the detecting process is again executed and the flag F2 is set to 0. Here, the predetermined amount Qth is set to a relatively large value, e.g., a value corresponding to about 70-90% of the volume of the developing cartridge 1.

The toner in the developing cartridge 1 is deteriorated due to frictional charging between the developing roller 12 and the supply roller 13. In this case, charging capability is lowered, for instance. For good printing, it is desirable that the toner in the developing cartridge 1 be composed of deteriorated toner and fresh toner mixed in an appropriate ratio. It is accordingly desirable that the amount of the toner in the developing cartridge 1 be held within a predetermined range. In the present embodiment, the supplying process is not executed when the toner amount Qr is larger than the predetermined amount Qth (Qr>Qth). Thus, in the case where the toner amount Qr in the developing cartridge 1 is too large, it is possible to wait until the toner amount in the developing cartridge 1 decreases to an appropriate amount, thus enabling the toner amount to be held within the predetermined range.

The supply-amount calculating process is a process of calculating a supply amount Qs of the toner that has been supplied in a current supplying process, based on an elapsed time Tp elapsed from a time point of completion of a preceding supplying process. The toner in the conveyor portion 22B among the toner in the toner cartridge 2 is particularly susceptible to a variation in density due to the elapsed time Tp from the time point of completion of the preceding supplying process. Thus, the controller 200 calculates the supply amount in the supply-amount calculating process such that the supply amount Qs that has been supplied in the current supplying process decreases with an increase in the elapsed time Tp from the time point of completion of the preceding supplying process.

Figure 6:
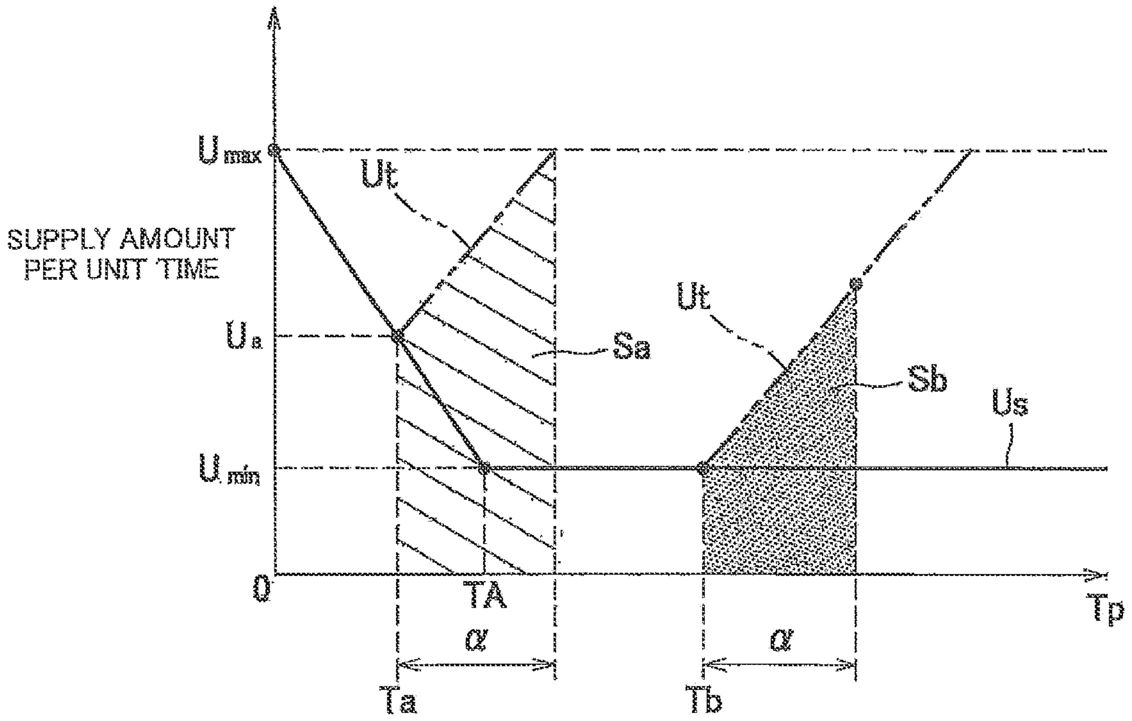
FIG. 6 is a view of a supply-amount calculating map.

Specifically, the controller 200 calculates the supply amount Qs based on a supply-amount calculating map shown in FIG. 6 and the elapsed time Tp. More specifically, in the supply-amount calculating process, the controller 200 obtains unit supply amounts Us, Ut each of which is a supply amount per unit time, based on the supply-amount calculating map, and adds up the unit supply amounts Us, Ut. Thus, the controller 200 calculates a total supply amount Qs supplied in the supplying process.

The supply-amount calculating map is a function indicating a relationship between: an initial unit supply amount Us which is a unit supply amount supplied at the time of start of the current supplying process; and the elapsed time Tp. The initial unit supply amount Us is set according to the following expression (6) in the case where the elapsed time Tp is in a range of 0-TA. The initial unit supply amount Us is set to a lower limit value Umin in the case where Tp>TA.

$$Us=-A\cdot Tp+U\max \tag{6}$$

A gradient "A" in the expression (6) may be suitably determined by experiments, simulations, or the like.

Based on the supply-amount calculating map described above, the controller 200 sets the initial unit supply amount Us such that the initial unit supply amount Us decreases with an increase in the elapsed time Tp from the time point of completion of the preceding supplying process. In the supply-amount calculating process, after having set the initial unit supply amount Us, the controller 200 gradually increases the unit supply amount Ut from the initial unit supply amount Us with a lapse of time. When the unit supply amount Ut becomes equal to an upper limit value Umax, the controller 200 sets the unit supply amount Ut to the upper limit value Umax. It is noted that a gradient of the unit supply amount Ut, namely, an increase amount per unit time, may be suitably determined by experiments, simulations, or the like.

Specifically, in the case where the elapsed time Tp is Ta (Ta<TA), the controller 200 sets the initial unit supply amount Us to Ua according to the expression (6). Thereafter, the controller 200 increases, from Ua, the unit supply amount Ut at a suitable gradient, and successively adds Ut to Ua. The controller 200 executes the supply-amount calculating process for a time length a corresponding to the execution period of the supplying process. That is, the controller 200 calculates an area of a diagonally shaded region Sa so as to calculate the total supply amount Qs.

In the case where the elapsed time Tp is Tb (Tb>TA), the controller 200 sets the initial unit supply amount Us to the lower limit value Umin. Thereafter, the controller 200 adds the unit supply amount Ut to the lower limit value Umin and calculates an area of a dot-shaded region Sb, so as to calculate the total supply amount Qs.

In the case where the supply amount Qs calculated in the supply-amount calculating process is equal to or smaller than a reference supply amount Qb, the controller 200 decreases the first threshold TH1. That is, in the case where the supply amount Qs in the current supplying process is small, the first threshold TH1 is set to a smaller value, whereby a next supplying process can be started at timing earlier than usual.

The controller 200 has a function of calculating an amount Qt of the toner remaining in the toner cartridge 2 (toner remaining amount Qt), based on the supply amount Qs calculated in the supply-amount calculating process. Specifically, every time when the supply-amount calculating process is executed, the controller 200 subtracts the supply amount Qs from an amount of the toner in the toner cartridge 2 in a brand-new condition, so as to calculate the toner remaining amount Qt. In this respect, when the toner cartridge 2 is replaced with another one, the toner remaining amount Qt is updated to an amount of the toner in the replaced another toner cartridge 2.

In the case where the toner remaining amount Qt in the toner cartridge 2 becomes equal to or smaller than a predetermined amount (3, the controller 200 notifies information indicating that the remaining amount is small. The information indicating that the remaining amount is small includes information encouraging replacement of the toner cartridge 2 and information indicating that the toner cartridge 2 needs to be replaced soon, for instance. The notification may be performed through a display panel, a lamp, or a buzzer of the printer 100, for instance. Alternatively, the notification may be performed through an external device, such as a computer, wiredly or wirelessly connected to the printer 100.

There will be next explained an operation of the controller 200 in detail.

Figure 7:
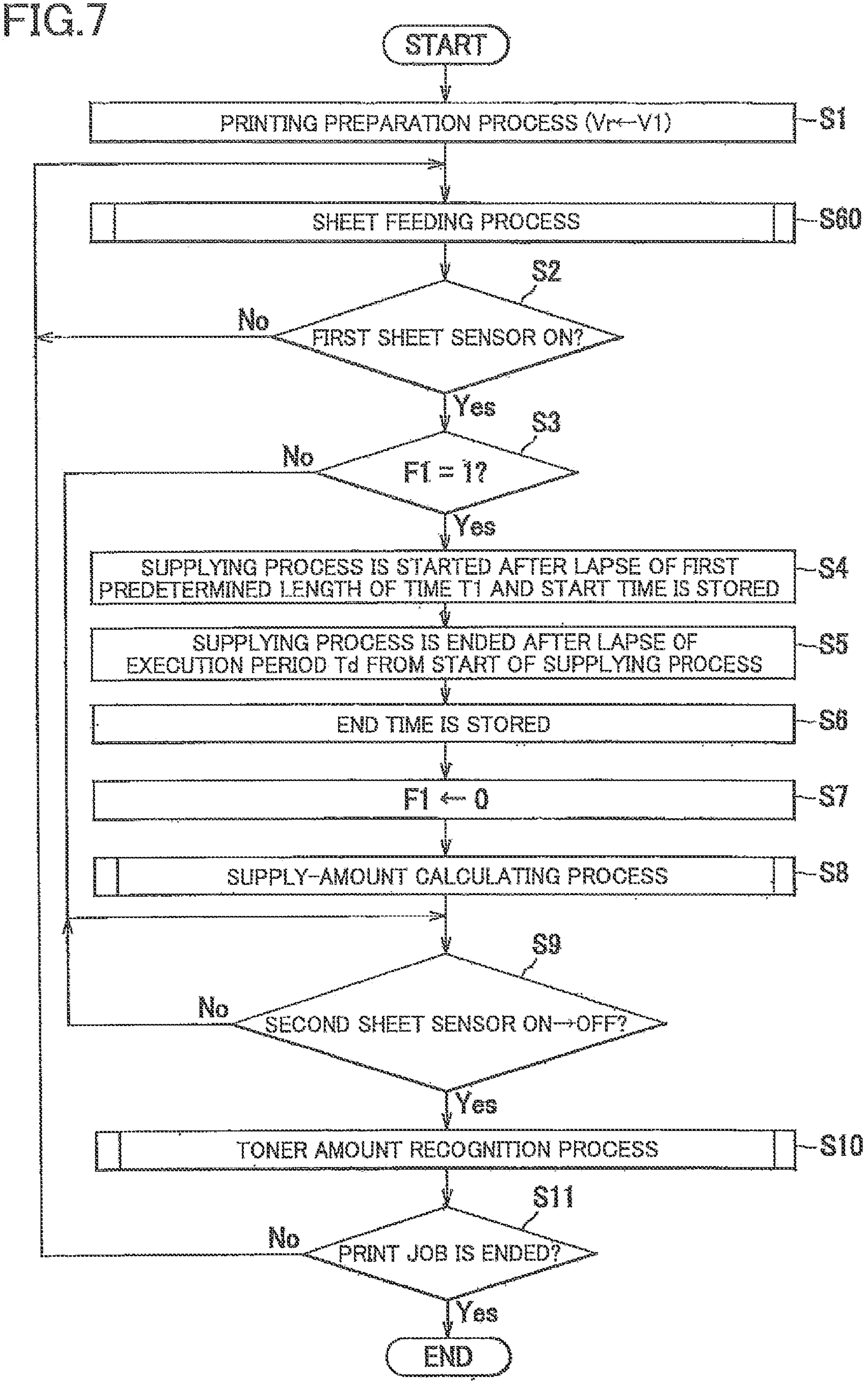
FIG. 7 is a flowchart indicating an operation of a controller.

As shown in FIG. 7, when the print job is started, the controller 200 executes a printing preparation process (S1). Specifically, at Step S1, the controller 200 controls the motor 300 to be in an ON state and applies a voltage to the developing roller 12, the charger 182, and so on. Thus, the developing roller 12 is rotated. In this instance, the controller 200 controls the motor 300 to rotate at a predetermined rotational speed such that a rotational speed Vr of the first agitator 15 is equal to the first speed V1.

After Step S1, the controller 200 executes a sheet feeding process in which the sheet supply mechanism 133 picks up the sheet S (S60). The sheet feeding process will be later explained in detail.

After Step S60, the controller 200 determines whether the ON state of the first sheet sensor 101 has been established (S2). When it is determined at Step S2 that the first sheet sensor 101 is in the ON state (Yes), the controller 200 determines whether or not the flag F1 for executing the supplying process is "1" (S3).

When it is determined at Step S3 that the flag F1 is 1 (F1=1) (Yes), the controller 200 starts the supplying process when the first predetermined length of time T1 elapses from the time point when the state of the first sheet sensor 101 has become ON, and stores the start time (S4). After Step S4, the controller 200 ends the supplying process when the execution period Td elapses from the time point when the supplying process has been started (S5).

After Step S5, the controller 200 stores the end time of the supplying process (S6) and returns the value of the flag F1 to "0" (S7). After Step S7, the controller 200 executes the supply-amount calculating process (S8). The supply-amount calculating process will be later explained in detail.

After Step S8 or when a negative decision is made at Step S3 (No), the controller 200 determines whether the state of the second sheet sensor 102 has been switched from ON to OFF (S9). When it is determined at Step S9 that the state of the second sheet sensor 102 is in the OFF state (Yes), the controller 200 executes a toner amount recognition process (S10). The toner amount recognition process will be later explained in detail.

After Step S10, the controller 200 determines whether the print job is ended (S11). When it is determined at Step S11 that the print job is not yet ended (No), the control flow goes back to Step S60. On the other hand, when it is determined at Step S11 that the print job is ended (Yes), the controller 200 ends the present control.

Figure 8:
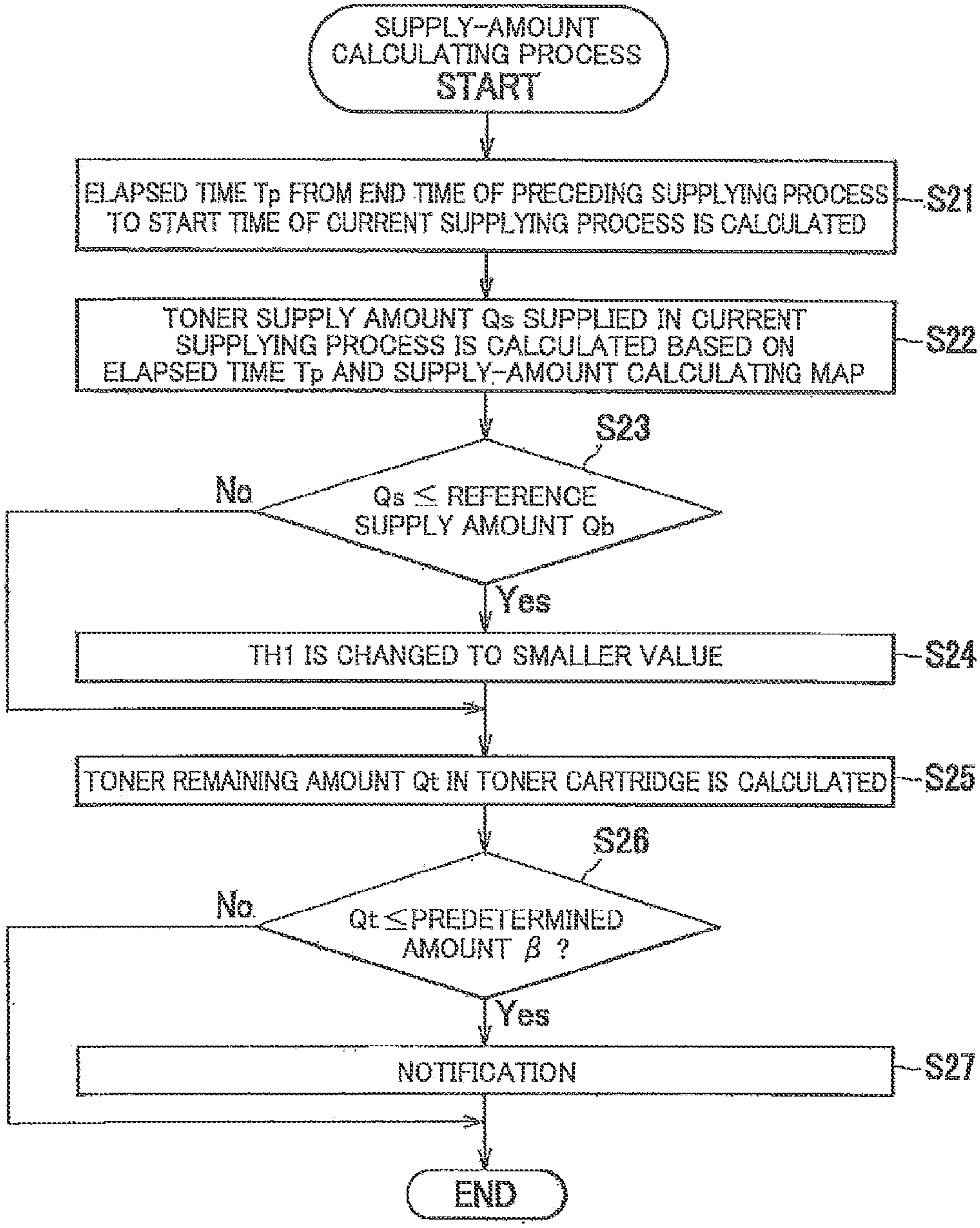
FIG. 8 is a flowchart indicating a supply-amount calculating process.

As shown in FIG. 8, in the supply-amount calculating process, the controller 200 calculates the elapsed time Tp from the end time of the preceding supplying process to the start time of the current supplying process (S21). After Step S21, the controller 200 calculates the supply amount Qs of the toner that has been supplied in the current supplying process based on the elapsed time Tp and the supply-amount calculating map (S22).

After Step S22, the controller 200 determines whether or not the supply amount Qs is equal to or smaller than the reference supply amount Qb (S23). When it is determined at Step S23 that the supply amount Qs is equal to or smaller than the reference supply amount Qb (Qs≤Qb)(Yes), the controller 200 changes the first threshold TH1 for determining whether the supplying process is permitted to be executed, to a value smaller than the current value (S24). Specifically, the first threshold TH1 is changed to a smaller value by multiplying the current value of the first threshold TH1 by a coefficient less than 1 or by subtracting a predetermined value from the current value.

After Step S24 or when a negative decision is made at Step S23 (No), the controller 200 calculates the toner remaining amount Qt in the toner cartridge 2 based on the supply amount Qs (S25). After Step S25, the controller 200 determines whether or not the toner remaining amount Qt in the toner cartridge 2 is equal to or smaller than the predetermined amount β (S26).

When it is determined at Step S26 that the toner remaining amount Qt is equal to or smaller than the predetermined amount β (Qt≤β) (Yes), the controller 200 notifies a user of information indicating that the toner remaining amount Qt in the toner cartridge 2 is small (S27). After Step S27 or when a negative decision is made at Step S26 (No), the controller 200 ends the supply-amount calculating process.

Figure 9:
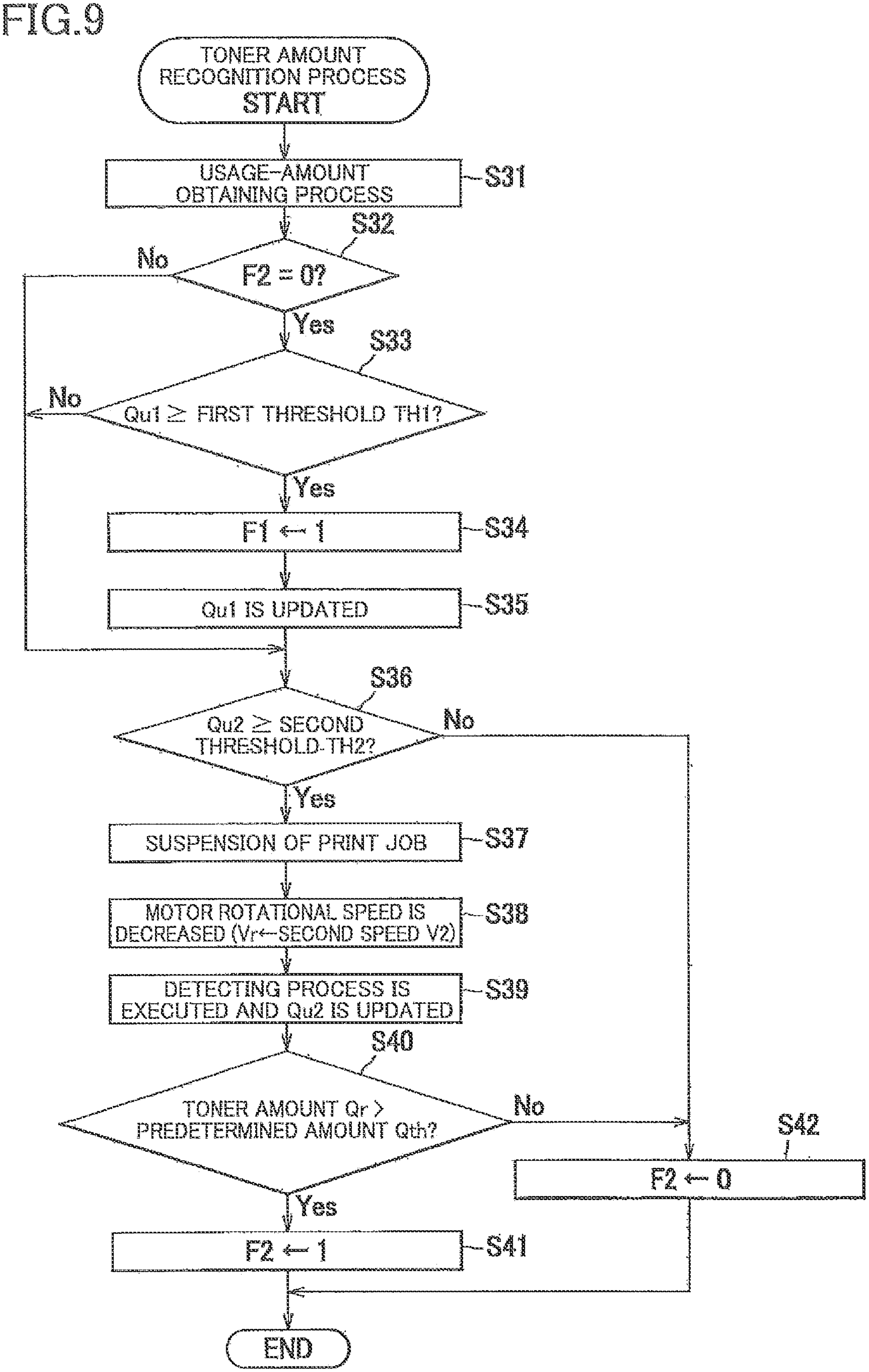
FIG. 9 is a flowchart indicating a toner amount recognition process.

As shown in FIG. 9, in the toner amount recognition process, the controller 200 executes the usage-amount obtaining process (S31), so as to calculate the usage amount Qu of the toner. After Step S31, the controller 200 determines whether or not the flag F2 is 0, the flag F2 being for indicating that the toner amount in the developing cartridge 1 is larger than the predetermined amount (S32). When it is determined at Step S32 that the flag F2 is 0 (F2=0) (Yes), the controller 200 determines whether or not the increase amount Qu1 of the usage amount Qu from the time point of execution of the preceding supplying process up to the current time point is equal to or greater than the first threshold TH1 (S33).

When it is determined at Step S33 that the increase amount Qu1 is equal to or greater than the first threshold TH1 (Qu1>TH1) (Yes), the controller 200 sets the flag F1 for executing the supplying process, to 1 (S34). After Step S34, the controller 200 updates the increase amount Qu1 to Qu1−TH1 (S35).

After Step S35 or when a negative decision is made at Step S32, Step S33 (No), the controller 200 determines whether or not the increase amount Qu2 of the usage amount Qu from the time point of execution of the preceding detecting process up to the current time point is equal to or greater than the second threshold TH2 (S36). When it is determined at Step S36 that the increase amount Qu2 is equal to or greater than the second threshold TH2 (Qu2≥TH2) (Yes), the controller 200 suspends the print job (S37). Specifically, the controller 200 stops, at Step S37, pickup of the sheet S by the sheet supply mechanism 133.

After Step S37, the controller 200 decreases the rotational speed of the motor 300 to a value lower than the current value, whereby the rotational speed Vr of the first agitator 15 is decreased to the second speed V2 lower than the first speed V1 (S38). Thus, the first agitator 15 rotates more slowly than in printing.

After Step S38, namely, after the rotational speed of the first agitator 15 has been lowered, the controller 200 executes the detecting process (S39). Thus, the detecting process can be appropriately executed. After the detecting process is executed, the controller 200 updates the increase amount Qu2 to Qu2−TH2.

After Step S39, the controller 200 determines whether the toner amount Qr detected in the detecting process is larger than the predetermined amount Qth (S40). When it is determined at Step S40 that the toner amount Qr is larger than the predetermined amount Qth (Qr>Qth) (Yes), the controller 200 sets the flag F2 to 1 (S41), the flag F2 indicating that the toner amount in the developing cartridge 1 is larger than the predetermined amount. When a negative decision is made at Step S36, S40 (No), the controller 200 sets the flag F2 described above to 0 (S42). The controller 200 ends the present control after Step S41 or Step S42.

Figure 10:
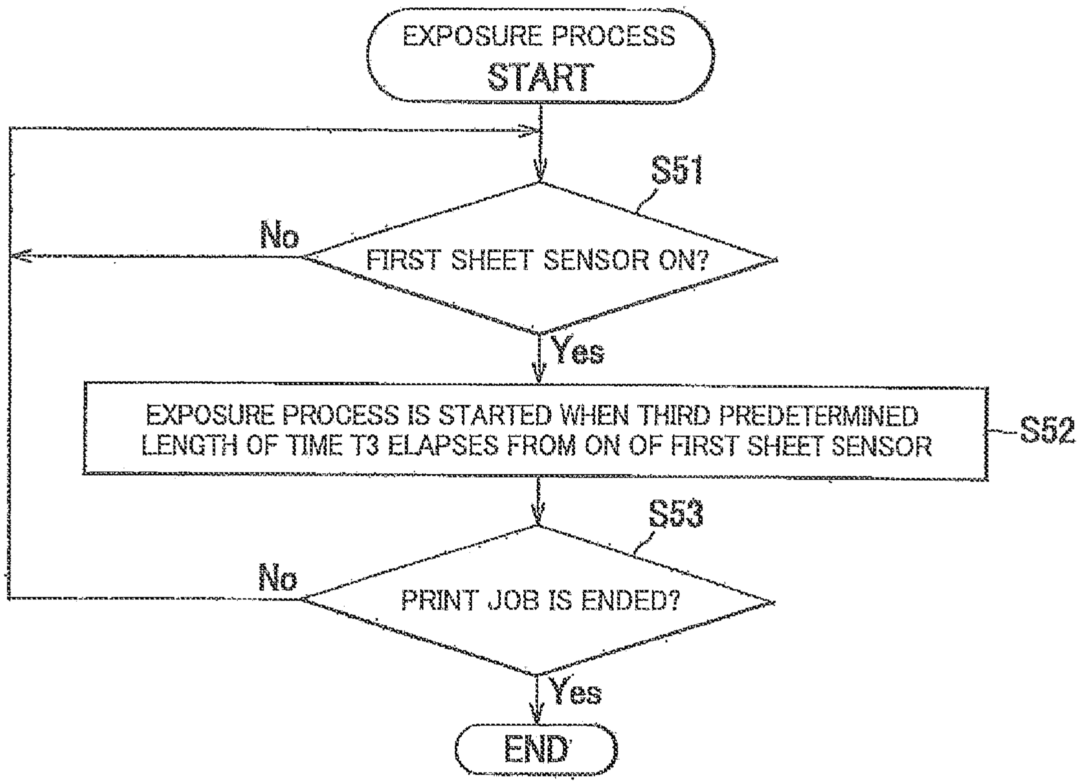
FIG. 10 is a flowchart indicating an exposure process.
Figure 11:
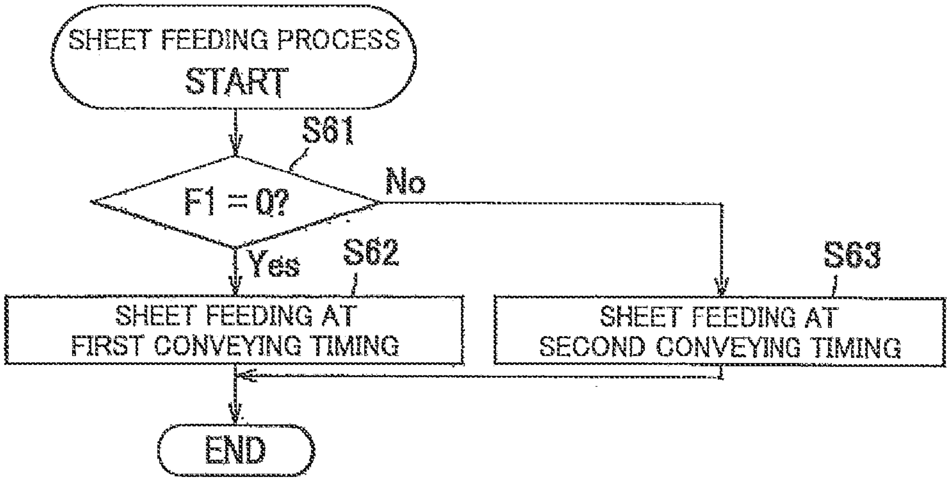
FIG. 11 is a flowchart indicating a sheet feeding process.

The controller 200 executes the exposure process shown in FIG. 10 and the sheet feeding process shown in FIG. 11.

In the exposure process of FIG. 10, when a print command is received, the controller 200 determines whether the ON state of the first sheet sensor 101 has been established (S51). When it is determined at Step S51 that the ON state of the first sheet sensor 101 has been established (Yes), the controller 200 starts the exposure process when the third predetermined length of time T3 elapses from the time point when the ON state of the first sheet sensor 101 has been established (S52). Here, the time of start of the supplying process is a time after the first predetermined length of time T1 shorter than the third predetermined length of time T3 has elapsed from the time point of the establishment of the ON state of the first sheet sensor 101. Accordingly, the supplying process is started before the exposure process is started.

At Step S52, the controller 200 executes the exposure process for one sheet. That is, the controller 200 executes the exposure process for a predetermined execution time length Te. In this respect, the execution period Td is set according to the expression (5). Accordingly, the supplying process is ended after completion of the exposure process.

After Step S52, the controller 200 determines whether the print job is ended (S53). When it is determined at Step S53 that the print job is not yet ended (No), the control flow goes back to Step S51. When it is determined at Step S53 that the print job is ended (Yes), the controller 200 ends the present control.

In the sheet feeding process shown in FIG. 11, the controller 200 determines whether or not the flag F1 for executing the supplying process is 0 (S61). When it is determined at Step S61 that the flag F1 is 0 (F1=0) (Yes), the controller 200 executes feeding of the next sheet S at suitable timing from the start of the print job or at the first conveying timing from timing at which one sheet S has been fed last time (S62). Thus, in the case where the supplying process is not executed in successive printing, a distance between successively conveyed two sheets S is equal to the first distance.

On the other hand, when it is determined at Step S61 that the first flag F1 is not 0 (No), the controller 200 executes feeding of the next sheet S at suitable timing from the start of the print job or at the second conveying timing later than the first conveying timing, with respect to preceding feeding timing (S63). Thus, in the case where the supplying process is executed in successive printing, the distance between successively conveyed two sheets S is equal to the second distance larger than the first distance.

After Step S62, S63, the controller 200 ends the present control.

There will be next explained a concrete example of the operation of the controller 200.

As shown in FIG. 7, when the controller 200 receives the print command of successive printing, the controller 200 repeats the processes of S1-S3 (S3: No) and S9-S11 (S11: No). Thus, every time when printing is performed on one sheet S, the usage-amount obtaining process (FIG. 9: S32) is executed. When the usage amount Qu which is successively added up every time when the usage-amount obtaining process is executed becomes equal to or greater than the first threshold TH1 (S33: Yes), the flag F1 is set to 1 (S34). Accordingly, the conveying timing of the sheet S is switched, in the sheet feeding process of FIG. 11, from the first conveying timing to the second conveying timing (S65), so that a distance between the sheet S that has been fed last time and the sheet S to be fed this time becomes equal to the second distance larger than the first distance.

When the sheet S that has been fed this time passes the first sheet sensor 101 (S2: Yes), an affirmative decision is made at Step S3 (Yes), and the supplying process is executed (S4, S5).

When the supplying process is executed, the supply amount Qs is calculated in the supply-amount calculating process of Step S8 (FIG. 8: S22). When the calculated supply amount Qs is equal to or smaller than the reference supply amount Qb (S23: Yes), the first threshold TH1 is changed to a value smaller than the current value (S24). When the toner remaining amount Qt in the toner cartridge 2 calculated based on the supply amount Qs is equal to or smaller than the predetermined amount β (S26: Yes), the user is notified that the toner amount in the toner cartridge 2 is small (S27).

As shown in FIG. 9, when the increase amount Qu2 of the usage amount Qu which increases every time when printing is performed on one sheet S becomes equal to or greater than the second threshold TH2 (S36), the print job is suspended, and the first agitator 15 slowly rotates at the second speed V2 (S37, 38). It is thus possible to accurately execute the detecting process by the optical sensor 190 (S39).

When the toner amount Qr in the developing cartridge 1 obtained in the detecting process is larger than the predetermined amount Qth (S40: Yes), the flag F2 is set to 1 (S41). Accordingly, the comparison (S33) between the increase amount Qu1 of the usage amount Qu and the first threshold TH1 is not performed until the toner amount Qr in the developing cartridge 1 obtained in the next detecting process becomes smaller than the predetermined amount Qth (S40: No) and the flag F2 is accordingly set to 0 (S42). Thus, when the toner amount Qr in the developing cartridge 1 is larger than the predetermined amount Qth, the supplying process is not executed.

The present embodiment offers the following advantageous effects.

The detecting process is executed in a period in which the print job is suspended, namely, in a period in which the developing process is not being executed, enabling accurate detection of the toner amount in the developing cartridge 1 by the optical sensor 190. Further, the frequency of execution of the detecting process is lower than that of the supplying process. Thus, the detecting process can be executed in the case where there is a possibility that the toner amount in the developing cartridge 1 varies by a plurality of times of execution of the supplying processes.

The first agitator 15 is operated in the detecting process at the first speed V1 lower than the second speed V2. This configuration prevents or reduces flying or scattering of the toner in the developing cartridge 1 in the detecting process and enables accurate detection of the toner amount by the optical sensor 190.

When the condition for starting the detecting process is satisfied in a period in which the print job is being executed, the print job is suspended and the detecting process is executed. This configuration enables the toner amount in the developing cartridge 1 to be recognized at an earlier stage even in the case where the number of pages to be successively printed is large.

The supplying process is not executed when the toner amount Qr detected in the detecting process is larger than the predetermined amount Qth, so as to prevent the toner from being excessively supplied into the developing cartridge 1.

The first threshold TH1 is set so as to satisfy the expression (1). It is thus possible to prevent shortage of the toner in the developing cartridge 1 even when printing, in which the amount of the toner used for one sheet S is maximal, is successively performed on a plurality of sheets S.

The toner cartridge 2 is mountable on and removable from the developing cartridge 1. When the amount of the toner in the toner cartridge 2 becomes less than a usable amount, only the toner cartridge 2 can be replaced without replacing the developing roller 12.

The supplying process is started before the formation of the electrostatic latent image is started. This configuration prevents or reduces disturbance of the electrostatic latent image on the photoconductive drum 181 due to vibration caused at the time of starting the supplying process, namely, vibration caused at the time of switching the state of the transmitting mechanism TM. Further, detection, by the first sheet sensor 101, of the sheet S conveyed toward the transfer roller 183 triggers the starting of the supplying process, and the supplying process is started before the formation of the electrostatic latent image for that sheet S is started, so that the toner is supplied into the developing cartridge 1 before the developing process for that sheet S is executed. Thus, when the developing process is executed, the condition of the toner in the developing cartridge 1, namely, the ratio between deteriorated toner and fresh toner, is better than that before the starting of the supplying process, so as to prevent or reduce deterioration in the image quality.

In the case where the developing roller 12 and the auger 22 are driven by the same motor 300 common thereto, the load of the motor 300 varies when the state of the transmitting mechanism TM is switched from the disconnected state to the connected state. In this case, the rotation of the developing roller 12 becomes unstable, and the rotation of the photoconductive drum 181 that contacts the developing roller 12 accordingly becomes unstable. If the exposure process is executed in such a state, the electrostatic latent image tends to disturb. In the present embodiment, however, the supplying process is started before the exposure process is executed, namely, the transmitting mechanism TM is switched. It is thus possible to prevent or reduce disturbance of the electrostatic latent image.

The supplying process is ended after the formation of the electrostatic latent image for one sheet has been completed. This configuration prevents or reduces disturbance of the electrostatic latent image on the photoconductive drum 181 due to vibration caused at the time of end of the supplying process.

The execution period Td of the supplying process is set so as to satisfy the expression (4). According to this configuration, the supplying process is started and is ended in a period corresponding to a distance between two sheets S successively conveyed in successive printing, namely, a period in which the electrostatic latent image is not being formed. It is thus possible to prevent or reduce disturbance of the electrostatic latent image even in successive printing.

In usual successive printing in which the supplying process is not executed, the distance between the sheets S is set to the smaller first distance, thereby increasing the printing speed. In the case where the supplying process is executed in successive printing, the distance between the sheets S is set to the larger second distance. This configuration enables, with higher reliability, the supplying process to be started and to be ended in the period in which the electrostatic latent image is not being formed.

The toner supply amount Qs supplied in the supplying process is calculated by execution of the supply-amount calculating process, so that the amount of the toner actually supplied into the developing cartridge 1 can be recognized. Further, the supply amount of the toner that has been supplied in the current supplying process is calculated based on the elapsed time from the time point of execution of the preceding supplying process. This configuration enables the amount of the toner supplied into the developing cartridge 1 to be recognized even when the toner density in the toner cartridge 2 varies with a lapse of time. Further, the amount of the toner supplied into the developing cartridge 1 can be recognized even in the case where the execution period Td of the supplying process is set to a predetermined period corresponding to the predetermined number of rotations of the auger 22.

The toner remaining amount Qt in the toner cartridge 2 is calculated based on the supply amount Qs calculated in the supply-amount calculating process. Thus, the remaining amount of the toner in the toner cartridge 2 can be calculated.

When the toner remaining amount Qt in the toner cartridge 2 becomes equal to or smaller than the predetermined amount β, the controller 200 notifies information indicating that the remaining amount is small. Accordingly, the user is encouraged to replace the toner cartridge 2 with new one, for instance.

The first threshold TH1 is made smaller when the supply amount Qs calculated in the supply-amount calculating process is equal to or smaller than the reference supply amount Qb. In this configuration, in the case where the supply amount Qs of the toner that has been supplied in the current supplying process is small, it is possible to advance the start timing of the next supplying process, so that the amount of the toner in the developing cartridge 1 can be kept appropriate.

It is to be understood that the present disclosure is not limited to the details of the illustrated embodiment but may be embodied otherwise as described below. In the following explanation, the same reference signs as used in the illustrated embodiment are used to identify the same components and processes as those in the illustrated embodiment, and a detailed explanation thereof is dispensed with.

In the configuration of FIG. 9, the detecting process is executed after suspension of the print job. The present disclosure is not limited to this configuration. The detecting process may be executed after completion of the print job. Specifically, the controller 200 may execute control based on flowcharts shown in FIGS. 12-14.

Figure 12:
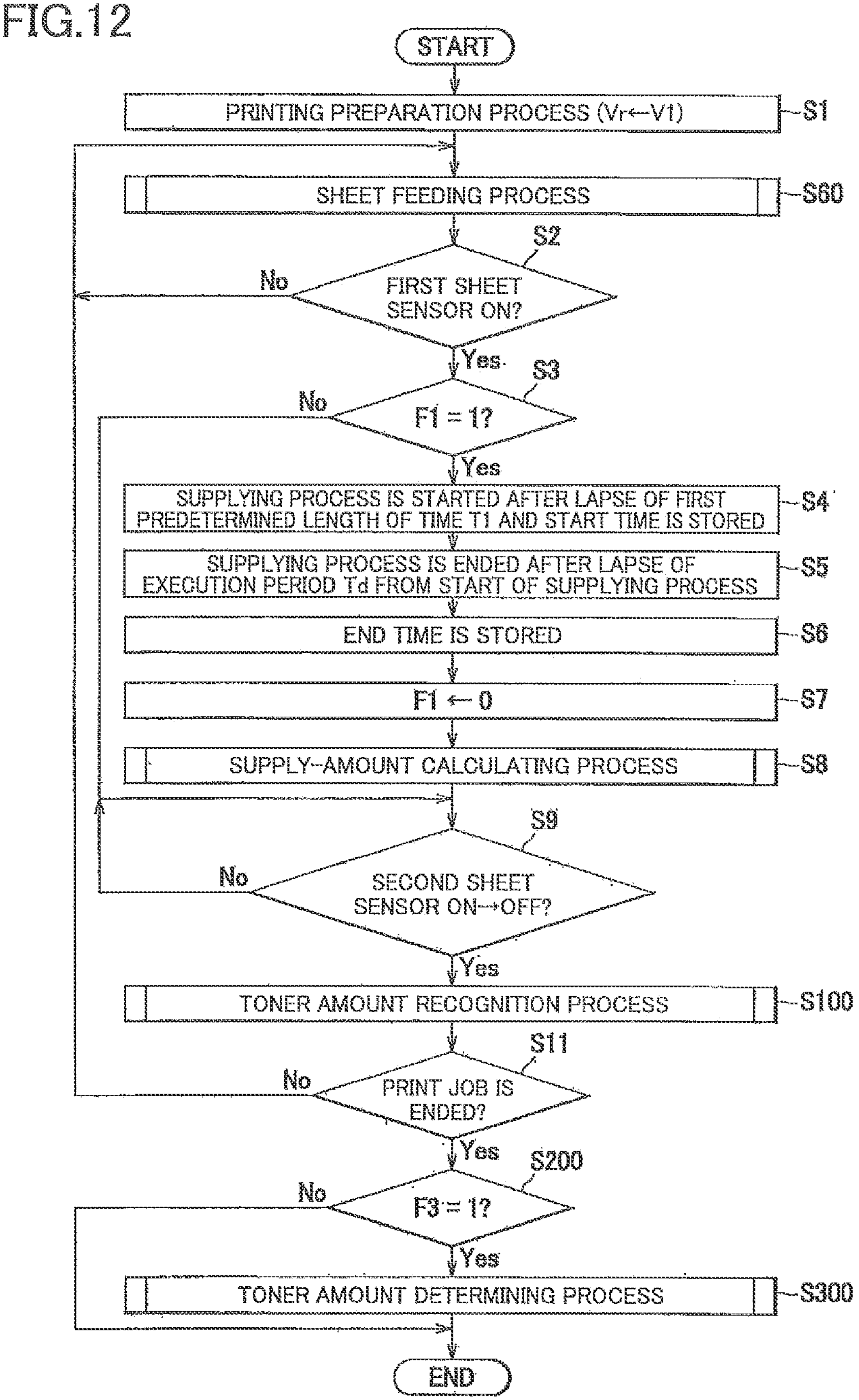
FIG. 12 is a flowchart indicating an operation of the controller according to a modification.

The flowchart of FIG. 12 includes Steps S1-9 and S11 similar to those of the flowchart of FIG. 7, new Step S100 in place of Step S10 of the flowchart of FIG. 7, and new Steps S200, S300 after Step S11.

Figure 13:
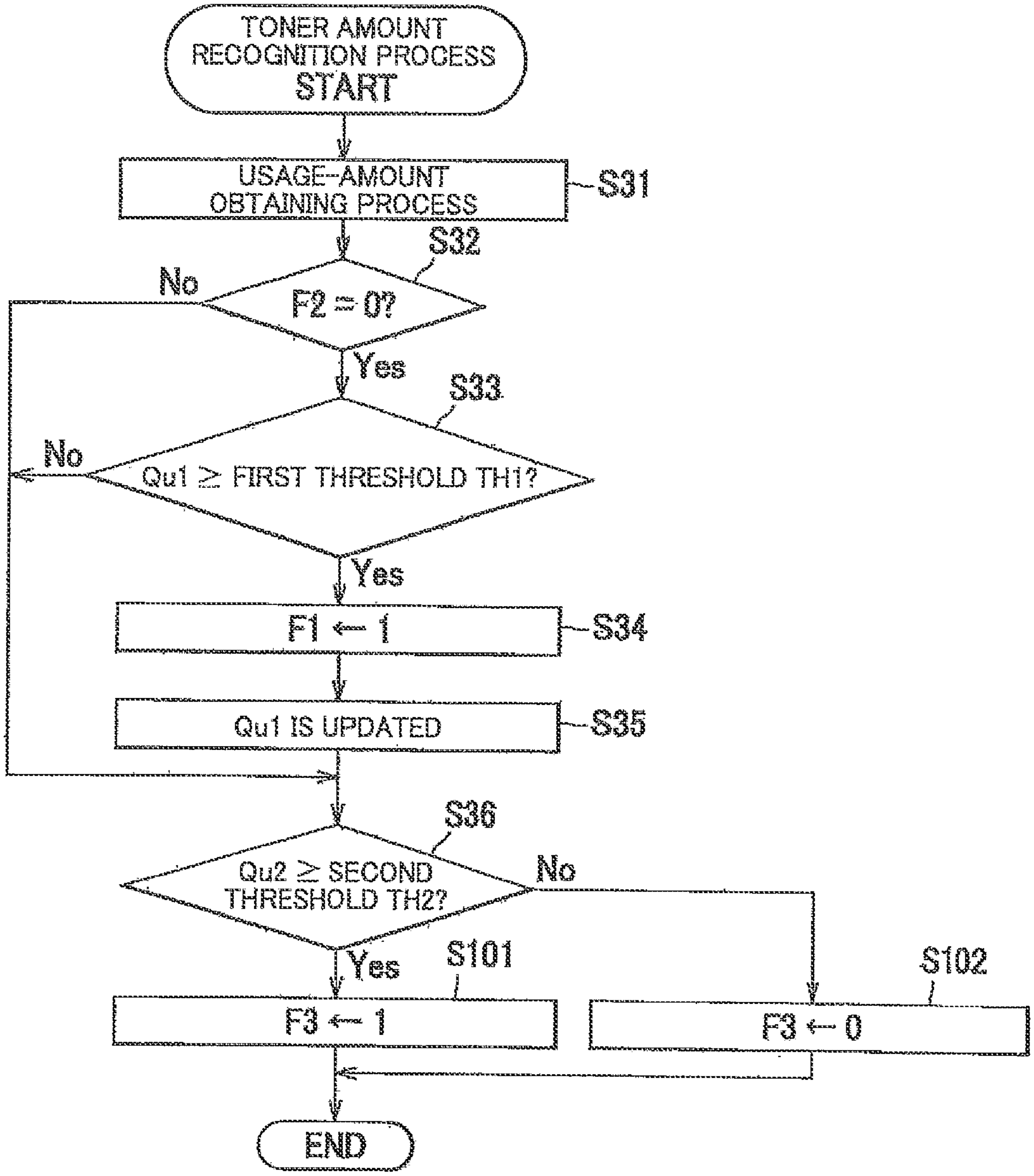
FIG. 13 is a flowchart indicating a toner amount recognition process according to the modification.

At Step S100, the controller 200 executes a toner amount recognition process which somewhat differs from the toner amount recognition process of the embodiment illustrated above. As shown in FIG. 13, the controller 200 executes, at Step S100, processes of Steps S31-S36 similar to those of the flowchart of FIG. 9. When it is determined at Step S36 that the second increase amount Qu2 is equal to or greater than the second threshold TH2 (Qu2≥TH2) (Yes), the controller 200 sets, to 1, a flag F3 for executing a toner amount determining process including the detecting process (S101).

When a negative decision is made at Step S36 (No), the controller 200 sets the flag F3 to 0 (S102). After Steps S101 and S102, the controller 200 ends the present control.

As shown in FIG. 12, when the controller 200 determines at Step S11 that the print job is ended (Yes), the controller determines whether or not the flag F3 is 1 (S200). When it is determined at Step S200 that F3 is 1 (F3=1) (Yes), the controller 200 executes the toner amount determining process (S300).

Figure 14:
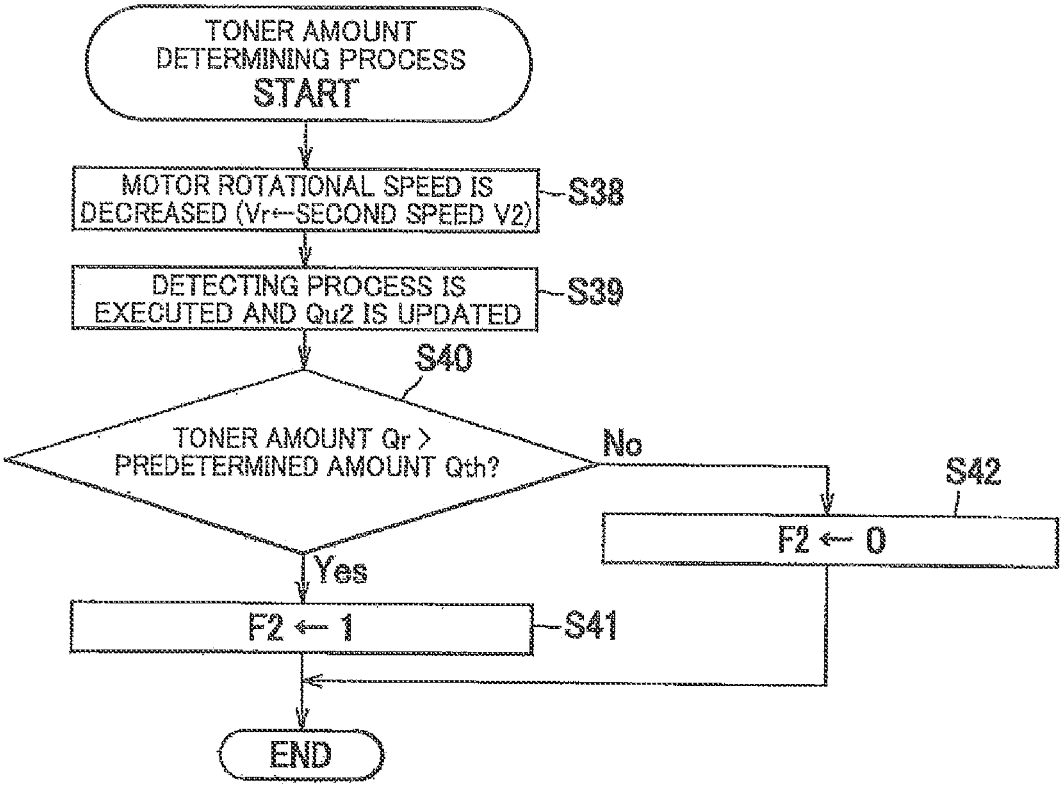
FIG. 14 is a flowchart indicating a toner amount determining process according to the modification.

As shown in FIG. 14, the controller 200 executes, in the toner amount determining process, processes of Steps S38-S42 similar to those of the flowchart of FIG. 9. Returning back to FIG. 12, when the controller 200 makes a negative decision at Step S200 (No) or after Step S300, the controller ends the present control. That is, in the configuration of FIGS. 12-14, the controller 200 executes the detecting process (S39) after completion of the print job (S11: Yes) depending upon the state of the flag F3.

The configuration described above enables the print job to be completed earlier, as compared with the configuration of FIG. 9 in which, when the condition for starting the detecting process is satisfied during execution of the print job, the print job is suspended and the detecting process is executed.

The second threshold TH2 in FIG. 13, i.e., the second threshold TH2 in the configuration in which the detecting process is executed after completion of the print job, may be the same as or different from the second threshold in the embodiment illustrated above, i.e., the second threshold TH2 in the configuration in which the detecting process is executed after suspension of the print job. For instance, the second threshold TH2 in FIG. 13 may be set to be smaller than that in the configuration of FIG. 9, and the present configuration may be combined with the configuration of FIG. 9. According to this arrangement, in the case where the print job is short, the detecting process is executed after completion of the print job as in the configuration of FIG. 13. On the other hand, in the case where the print job is long, the print job is suspended and the detecting process is executed as in the configuration of FIG. 9.

In the configuration of FIG. 9, in a situation in which the flag F2 is being set at 1, the flag F2 is set to 0 when the toner amount Qr in the developing cartridge 1 obtained in the next detecting process becomes equal to or smaller than the predetermined amount Qth. The flag F2 may be set to 0 on the condition that a predetermined number of sheets are printed after the flag F2 has been set to 1. In this arrangement, the supplying process is not executed during a time period in which the predetermine number of sheets are being printed.

In the illustrated embodiment, the auger 22 having the helical plate 22B is illustrated as one example of the supplier. The present disclosure is not limited to this configuration. For instance, the supplier may be configured to include a rotation shaft and a flat plate provided in parallel with the rotation shaft.

In the illustrated embodiment, the execution period Td of the supplying process is represented as a constant time. The execution period Td may be a time corresponding to a period in which the auger 22 is rotated by the predetermined number of times. In an arrangement in which the printing speed is changeable, for instance, the execution period Td may be configured to change in accordance with the printing speed such that the number of rotations of the auger 22 is constant for any printing speed.

In the illustrated embodiment, the photoconductive drum 181 is illustrated as one example of the photoconductor. The present disclosure is not limited to this configuration. The photoconductive drum 181 may be a belt-like photoconductor, for instance.

In the illustrated embodiment, the developing device and the developer storage are separately constituted. The present disclosure is not limited to this configuration. The developing device and the developer storage may be constituted integrally with each other.

In the illustrated embodiment, the usage amount Qu is obtained in the usage-amount obtaining process based on the number of dots of the image data. The present disclosure is not limited to this configuration. For instance, the usage amount may be obtained based on the number of printed sheets, the number of rotations of the photoconductive drum, or the number of detections of the sheet by the first sheet sensor or the second sheet sensor.

In the illustrated embodiment, the first agitator 15 having the single agitating blade 15B is illustrated as one example of the agitator. The present disclosure is not limited to this configuration. For instance, the agitator may include a plurality of agitating blades.

In the illustrated embodiment, the transfer roller 183 that contacts the photoconductive drum 181 is illustrated as one example of the transfer device. The present disclosure is not limited to this configuration. For instance, the transfer device may be a transfer member, in an intermediate transfer system, facing an intermediate transfer belt that contacts the photoconductor.

In the illustrated embodiment, the first sheet sensor 101 is illustrated as one example of the detector. The present disclosure is not limited to this configuration. For instance, the detector may be a sheet sensor provided upstream of the registration rollers in the conveyance direction.

In the illustrated embodiment, examples of the sheet S include thick paper, a post card, and thin paper. The present disclosure is not limited to this configuration. The sheet S may be an OHP sheet, for instance.

In the illustrated embodiment, the toner remaining amount Qt in the toner cartridge 2 is calculated based on the supply amount Qs calculated in the supply-amount calculating process. The present disclosure is not limited to this configuration. For instance, the toner amount to be supplied in the next supplying process (the execution period of the supplying process) may be changed based on the supply amount calculated in the supply-amount calculating process.

The exposing device 150 may be an exposure head including a light emitting element such as an LED and configured to expose the photoconductor in close proximity to the photoconductor.

The elements explained in the illustrated embodiment and the modification may be suitably combined.

What is claimed is:

1. An image forming apparatus comprising:

a photoconductor drum;

a developing unit including a developing roller and a developing unit housing allowing toner to be supplied;

a toner housing storing toner, the toner housing detachably attached to the developing unit;

a toner sensor configured to detect an amount of toner in the developing unit housing; and a controller configured to execute:

obtaining an amount of the toner used since a prior detection of the amount of the toner in the developing unit housing;

supplying the toner to the developing unit housing from the toner housing;

detecting, by the toner sensor, the amount of the toner in the developing unit housing only after determining that the obtained amount of the toner used since the prior detection is equal to or greater than a detecting threshold; and determining whether or not the amount of the toner in the developing unit housing is greater than a predetermined amount, so as to prevent the toner from being excessively supplied into the developing unit housing from the toner housing.

2. The image forming apparatus according to claim 1, wherein the controller is configured to further execute:

not supplying the toner to the developing unit housing from the toner housing in a case where the controller determines that the amount of the toner in the developing unit housing is greater than the predetermined amount.

* * * * *